(12) United States Patent
Watanabe et al.

(10) Patent No.: US 9,322,650 B2
(45) Date of Patent: Apr. 26, 2016

(54) PHYSICAL QUANTITY DETECTION DEVICE, PHYSICAL QUANTITY DETECTOR, AND ELECTRONIC APPARATUS

(71) Applicant: Seiko Epson Corporation, Tokyo (JP)

(72) Inventors: Jun Watanabe, Matsumoto (JP); Kazuyuki Nakasendo, Shiojiri (JP)

(73) Assignee: Seiko Epson Corporation (JP)

( * ) Notice: Subject to any disclaimer, the term of this patent is extended or adjusted under 35 U.S.C. 154(b) by 584 days.

(21) Appl. No.: 13/661,433

(22) Filed: Oct. 26, 2012

(65) Prior Publication Data

US 2013/0104677 A1    May 2, 2013

(30) Foreign Application Priority Data

Oct. 31, 2011   (JP) ................................. 2011-239119

(51) Int. Cl.

| | |
|---|---|
| *G01P 1/02* | (2006.01) |
| *G01C 9/06* | (2006.01) |
| *G01P 15/09* | (2006.01) |
| *G01P 15/097* | (2006.01) |
| *G01P 15/08* | (2006.01) |

(52) U.S. Cl.
CPC . *G01C 9/06* (2013.01); *G01P 15/09* (2013.01); *G01P 15/097* (2013.01); *G01P 2015/0828* (2013.01)

(58) Field of Classification Search
None
See application file for complete search history.

(56) References Cited

U.S. PATENT DOCUMENTS

| | | | |
|---|---|---|---|
| 4,509,610 A | * | 4/1985 | Hayashi .................... 177/211 |
| 5,113,698 A | | 5/1992 | Grlj et al. |
| 5,331,854 A | | 7/1994 | Hulsing, II |
| 5,412,992 A | * | 5/1995 | Tobita et al. .................. 73/721 |
| 6,591,689 B2 | * | 7/2003 | Nidan et al. .................. 73/754 |
| 2010/0018318 A1 | | 1/2010 | Watanabe et al. |
| 2012/0180575 A1 | * | 7/2012 | Sakano et al. ........... 73/862.626 |

FOREIGN PATENT DOCUMENTS

| | | |
|---|---|---|
| CN | 101634598 A | 1/2010 |
| EP | 0 401 669 | * 12/1990 |
| JP | 04032774 | * 5/1990 |

* cited by examiner

*Primary Examiner* — Robert R Raevis
(74) *Attorney, Agent, or Firm* — Harness, Dickey & Pierce, P.L.C.

(57) ABSTRACT

A physical quantity detection device includes: a base portion; a movable portion supported by the base portion via a joint and shifting in accordance with a change of a physical quantity; a physical quantity detection element extending over the base portion and the movable portion; a first support member extending from the base portion and having a first fixing portion; and a second support member extending from the base portion and having a second fixing portion. The distance between the first fixing portion and the second fixing portion is shorter than the distance between the root of the first support member at the junction with the base portion and the root of the second support member at the junction with the base portion.

14 Claims, 14 Drawing Sheets

PHYSICAL QUANTITY DETECTION DEVICE, PHYSICAL QUANTITY DETECTOR, AND ELECTRONIC APPARATUS

BACKGROUND

1. Technical Field

The present invention relates to a physical quantity detection device, a physical quantity detector, and an electronic apparatus.

2. Related Art

A physical quantity detection device (such as an acceleration sensor) which includes a physical quantity detection element such as an oscillator is known. This type of physical quantity detection device is so designed as to detect a force (acceleration) applied to the physical quantity detection device based on a change of the resonance frequency of the physical quantity detection element produced by a force acting in the direction of the detection axis.

In JP-T-4-505509, there is disclosed a sensor which has a double-ended crystal tuning fork converter (physical quantity detection element) both ends of which are fixed to a support structure containing a base assembly, a deflection, and a guaranteed mass.

According to the technology disclosed in JP-T-4-505509, however, a stress produced between plural fixing portions of the support structure when the support structure is fixed to a package, for example, due to the difference in the coefficient of linear expansion between the support structure and the package, may reach the physical quantity detection element via the support structure, and change the resonance frequency of the physical quantity detection element. In this case, the detection sensitivity of the physical quantity detection device deteriorates.

For avoiding transmission of this stress, a technology disclosed in U.S. Pat. No. 5,331,854 provides beam-shaped bended portions on a support structure supporting a physical quantity detection element, between which bended portions a guaranteed mass is sandwiched, so as to reduce the stress by using the bended portions.

According to the technology shown in U.S. Pat. No. 5,331,854, the bended portions are provided such that the guaranteed mass is sandwiched therebetween. In this case, the distance between the bended portions, that is, the distance between the plural fixing portions of the support structure fixed to the package is difficult to be reduced to a length equal to or shorter than the width of the guaranteed mass or the support structure (a length equal to or shorter than the distance between the roots of the two bended portions at the junction with the support structure). Thus, when the bended portions are fixed to the package, for example, the stress produced on the support structure by the difference in the coefficient of linear expansion between the support structure and the package may increase in accordance with the distance between the plural bended portions (fixing portions). In this case, the raised stress may reach the physical quantity detection element.

SUMMARY

An advantage of some aspects of the invention is to provide a physical quantity detection device capable of reducing a stress transmitted to a physical quantity detection element. Another advantage of some aspects of the invention is to provide a physical quantity detector and an electronic apparatus incorporating this physical quantity detection device.

APPLICATION EXAMPLE 1

A physical quantity detection device according to this application example of the invention includes: a base portion; a movable portion supported by the base portion via a joint and shifting in accordance with a change of a physical quantity; a physical quantity detection element extending over the base portion and the movable portion; a first support member extending from the base portion and having a first fixing portion; and a second support member extending from the base portion and having a second fixing portion. The distance between the first fixing portion and the second fixing portion is shorter than the distance between the root of the first support member at the junction with the base portion and the root of the second support member at the junction with the base portion.

The physical quantity detection device thus constructed prevents the physical quantity detection element from receiving a stress produced on a structure (structure including the base portion, the joint, the movable portion, and the support members) by the difference in the coefficient of linear expansion between the structure and an external unit such as a package and a circuit board when the physical quantity detection device is mounted on the external unit with the first fixing portion and the second fixing portion fixed thereto. Generally, the stress produced on the structure by the difference in the coefficient of linear expansion increases as the distance between the first fixing portion and the second fixing portion becomes longer. However, the physical quantity detection device which sets the distance between the first fixing portion and the second fixing portion shorter than the distance between the root of the first support member at the junction with the base portion and the root of the second support member at the junction with the base portion in this application example of the invention can reduce the stress produced on the structure (such as the base portion) by the difference in the coefficient of linear expansion. Accordingly, the physical quantity detection device can avoid transmission of the stress to the physical quantity detection element, thereby increasing the detection sensitivity.

APPLICATION EXAMPLE 2

The physical quantity detection device according to the application example of the invention may be configured such that the first support member is bended in the range of extension from the base portion to the first fixing portion, and the second support member is bended in the range of extension from the base portion to the second fixing portion.

The physical quantity detection device thus constructed can reduce a stress produced on the first fixing portion and the second fixing portion by fixation of the first and second fixing portions to an external unit such as a package prior to transmission of the stress to the physical quantity detection element.

APPLICATION EXAMPLE 3

The physical quantity detection device according to the application example of the invention may be configured such that the first support member is bended in a reciprocating manner in the range of extension from the base portion to the first fixing portion, and the second support member is bended in a reciprocating manner in the range of extension from the base portion to the second fixing portion.

The physical quantity detection device thus constructed can further reduce a stress produced on the first fixing portion and the second fixing portion by fixation of the first and second fixing portions to an external unit such as a package prior to transmission of the stress to the physical quantity detection element.

APPLICATION EXAMPLE 4

The physical quantity detection device according to the application example of the invention may be configured such that the first support member includes a first extended portion, and a second extended portion provided in the range of extension from the first extended portion to the first fixing portion and extended in a first direction different from a first extension direction of the first extended portion. The second support member may include a third extended portion, and a fourth extended portion provided in the range of extension from the third extended portion to the second fixing portion and extended in a second direction different from a second extension direction of the third extended portion. The width of the first extended portion in the first direction may be larger than the width of the second extended portion in the first extension direction. The width of the third extended portion in the second direction may be larger than the width of the fourth extended portion in the second extension direction.

According to the physical quantity detection device thus constructed, the second extended portion and the fourth extended portion more easily bend when acceleration is applied to the physical quantity detection device, thereby avoiding distortion of the first extended portion and the third extended portion. As a result, distortion of the root of the first support member at the junction with the base portion and the root of the second support member at the junction with the base portion decreases, which prevents deterioration of the acceleration detection sensitivity and the reliability.

APPLICATION EXAMPLE 5

The physical quantity detection device according to the application example of the invention may be configured to include a connection body disposed with a clearance left between the connection body and the movable portion and extending from at least either the first support member or the second support member, or from the base portion. The connection body may have a third fixing portion at which the connection body is fixed. The center of gravity of the physical quantity detection device may lie in a range surrounded by the first fixing portion, the second fixing portion, and the third fixing portion in the plan view.

The physical quantity detection device thus constructed can be fixed to an external unit such as a package in a stable position without inclination (distortion) in any directions. Accordingly, the acceleration detection sensitivity and the reliability do not deteriorate.

APPLICATION EXAMPLE 6

The physical quantity detection device according to the application example of the invention may be configured to further include a connection body disposed with a clearance left between the connection body and the movable portion and extending from at least either the first support member or the second support member, or from the base portion, and a third support member extending from the connection body and having a fourth fixing portion. The center of gravity of the physical quantity detection device may lie in a range surrounded by the first fixing portion, the second fixing portion, and the fourth fixing portion in the plan view.

The physical quantity detection device thus constructed can be fixed to an external unit such as a package in a stable position without inclination (distortion) in any directions. Accordingly, the acceleration detection sensitivity and the reliability do not deteriorate.

APPLICATION EXAMPLE 7

The physical quantity detection device according to the application example of the invention may be configured to further include a connection body disposed with a clearance left between the connection body and the movable portion and extending from at least either the first support member or the second support member, or from the base portion, a third support member extending from the connection body and having a fourth fixing portion, and a fourth support member extending from the connection body and having a fifth fixing portion. The center of gravity of the physical quantity detection device may lie in a range surrounded by the first fixing portion, the second fixing portion, the fourth fixing portion, and the fifth fixing portion in the plan view.

The physical quantity detection device thus constructed can be fixed to an external unit such as a package in a stable position without inclination (distortion) in any directions. Accordingly, the acceleration detection sensitivity and the reliability do not deteriorate.

APPLICATION EXAMPLE 8

The physical quantity detection device according to the application example of the invention may be configured such that the connection body is bended in the range of extension from the third support member to the fourth support member.

The physical quantity detection device thus constructed can reduce a stress produced on the first fixing portion and the second fixing portion by fixation of the first and second fixing portions to an external unit such as a package prior to transmission of the stress to the physical quantity detection element.

APPLICATION EXAMPLE 9

The physical quantity detection device according to the application example of the invention may be configured such that the base portion, the first fixing portion, and the second fixing portion are arranged on a line in the plan view.

The physical quantity detection device thus constructed can prevent the physical quantity detection element from receiving a stress produced by thermal expansion of an external unit such as a package along a second axis (X axis) perpendicular to a first axis (Y axis) extending along the line.

APPLICATION EXAMPLE 10

A physical quantity detector according to this application example of the invention includes: the physical quantity detection device of any one of the application examples of the invention; and a package which houses the physical quantity detection device.

The physical quantity detector having this structure includes the physical quantity detection device according to any one of the application examples of the invention. Thus, the detection sensitivity of the physical quantity detector increases.

APPLICATION EXAMPLE 11

An electronic apparatus according to this application example of the invention includes the physical quantity detection device of any one of the application examples of the invention.

The electronic apparatus having this structure includes the physical quantity detection device according to any one of the application examples of the invention. Thus, the detection sensitivity of the electronic apparatus increases.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments according to the invention will be hereinafter described with reference to the drawings.

1. First Embodiment 1.1. Physical Quantity Detection Device

Figure 1:
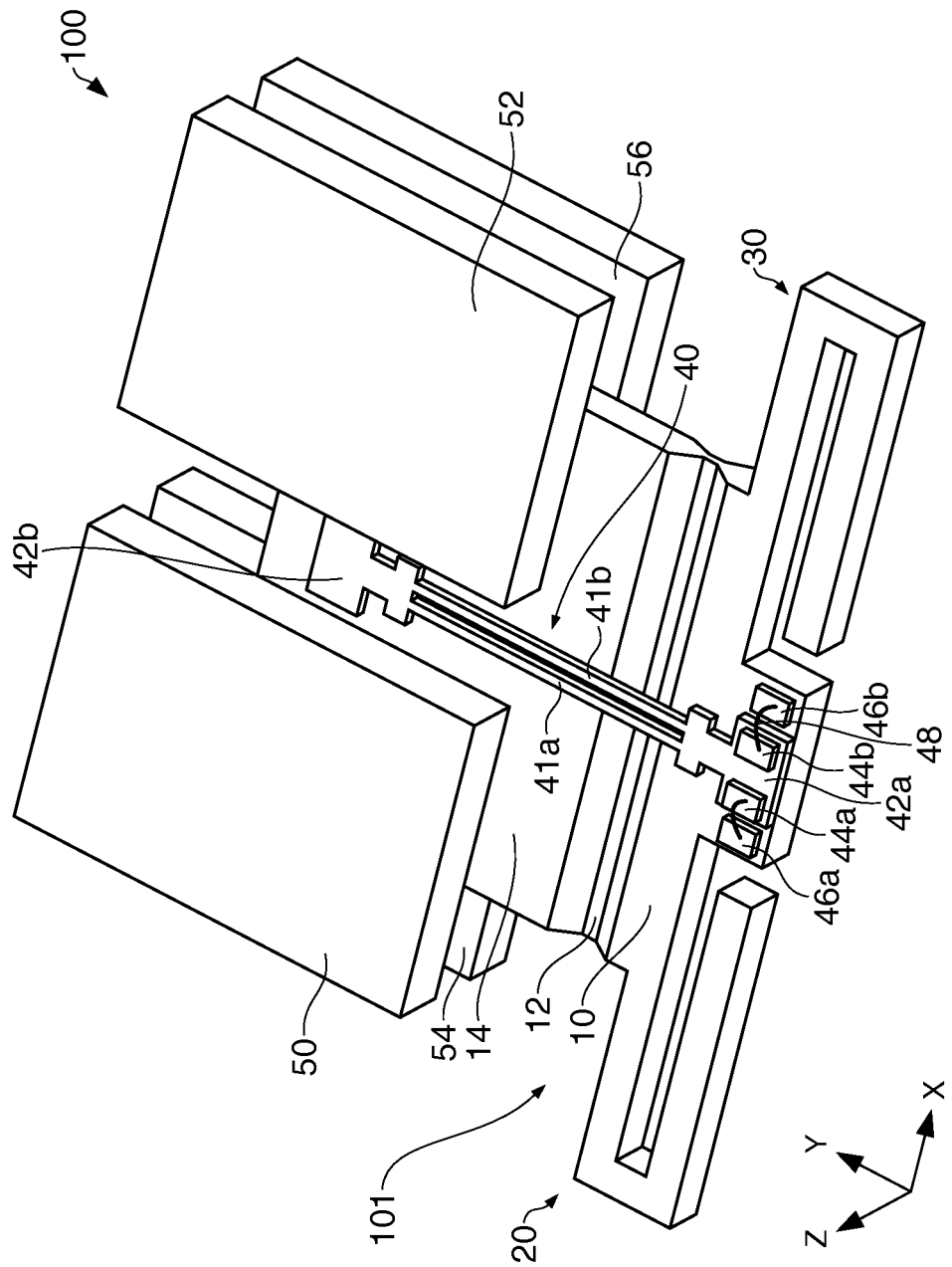
FIG. 1 is a perspective view schematically illustrating a physical quantity detection device according to a first embodiment.
Figure 2:
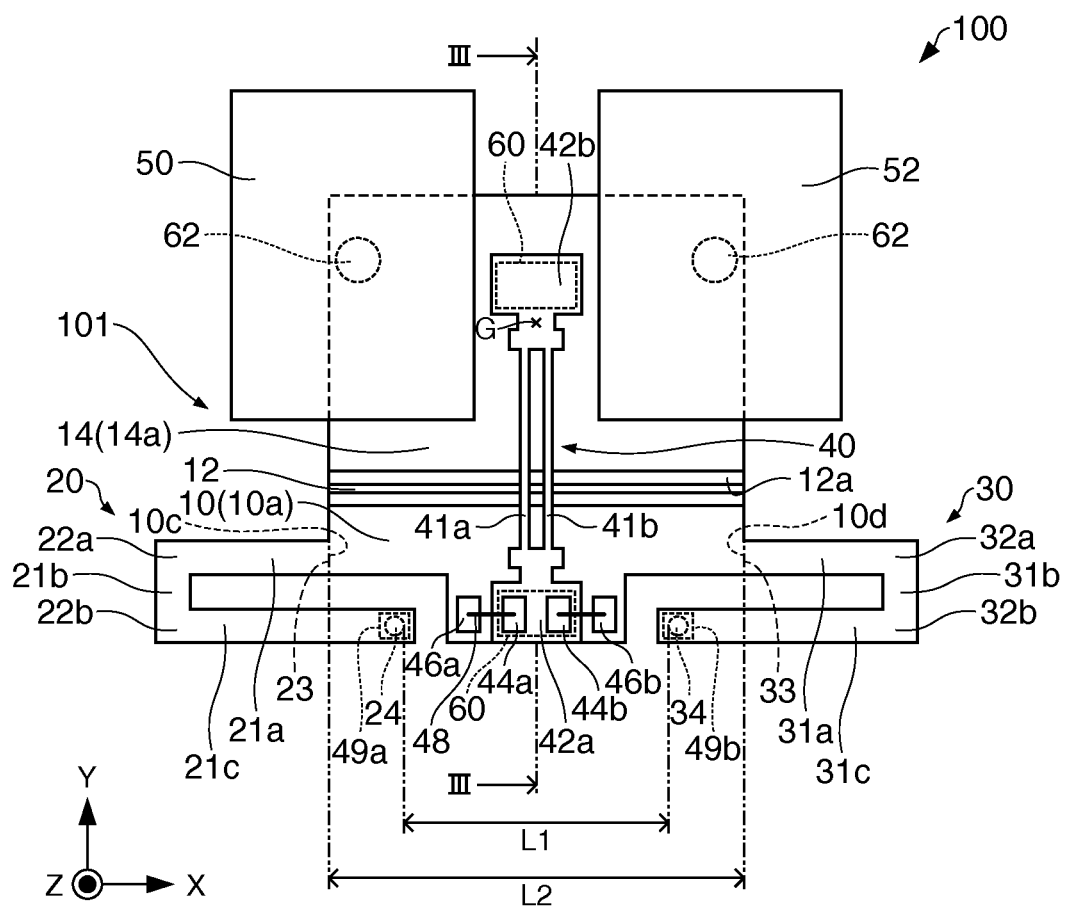
FIG. 2 is a plan view schematically illustrating the physical quantity detection device according to the first embodiment.
Figure 3:
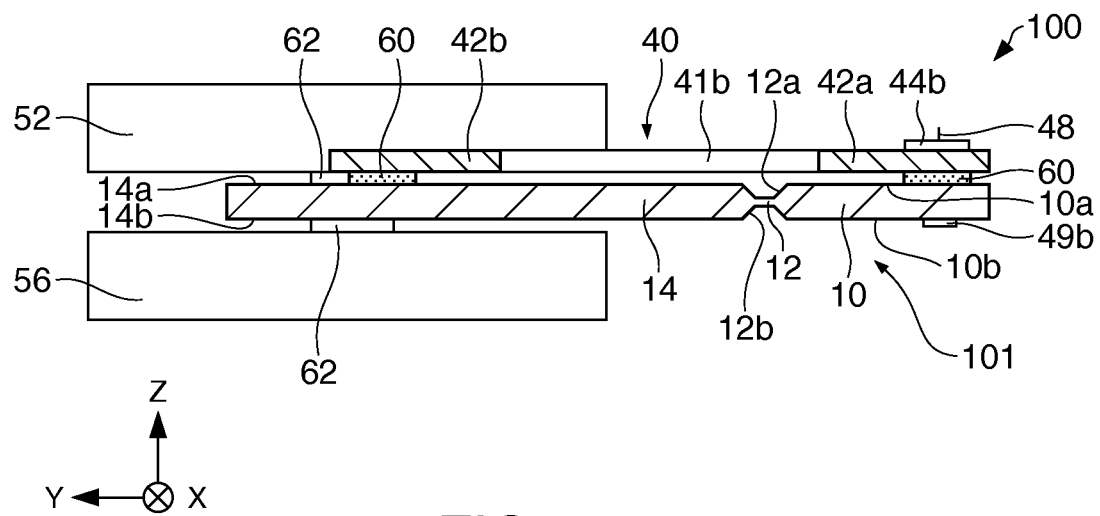
FIG. 3 is a cross-sectional view schematically illustrating the physical quantity detection device according to the first embodiment.

A physical quantity detection device according to a first embodiment is initially discussed in conjunction with the drawings. FIG. 1 is a perspective view schematically illustrating a physical quantity detection device 100 according to a first embodiment. FIG. 2 is a plan view schematically illustrating the physical quantity detection device 100 according to the first embodiment. FIG. 3 is a cross-sectional view taken along a line III-III in FIG. 2, schematically illustrating the physical quantity detection device 100 according to the first embodiment. For the purpose of explanation, FIGS. 1 through 3 and FIGS. 4 through 15 referred to below are shown on the basis of X axis, Y axis, and Z axis as three axes crossing each other at right angles.

As illustrated in FIGS. 1 through 3, the physical quantity detection device 100 includes a base portion 10, a joint 12, a movable portion 14, a first support member 20 and a second support member 30 as a support body, and a physical quantity detection element 40. The physical quantity detection device 100 is allowed to further include masses 50, 52, 54, and 56.

The base portion 10 supports the movable portion 14 via the joint 12. The joint 12 provided between the base portion 10 and the movable portion 14 connects with the base portion 10 and the movable portion 14. The thickness of the joint 12 is smaller than each of the thicknesses of the base portion 10 and the movable portion 14. The joint 12 is defined by grooves 12a and 12b (see FIG. 3) formed in both main surfaces of a crystal substrate by half-etching, for example. According to the example shown in the figures, the grooves 12a and 12b are formed along the X axis. The joint 12 becomes a rotation axis extending along the X axis and corresponding to a fulcrum (intermediate hinge) when the movable portion 14 shifts (rotates) relative to the base portion 10.

The movable portion 14 connects with the base portion 10 via the joint 12. The movable portion 14 is supported by the base portion via the joint 12. According to the example shown in the figures, the movable portion 14 extends along the Y axis (first axis) toward the +Y side from the base portion 10 with the joint 12 provided between the base portion 10 and the movable portion 14. The movable portion 14 has a plate shape, and includes main surfaces 14a and 14b facing to the sides opposite to each other (opposite sides). The movable portion 14 can shift (rotate) in a direction crossing the main surface 14a (Z axis direction) around a fulcrum (rotation axis) corresponding to the joint 12 in accordance with a change of a physical quantity (acceleration) applied in the direction crossing the main surface 14a (14b), i.e., in the Z axis direction.

The support body extends from the base portion 10 to support the base portion 10. The first support member 20 is defined as a portion of the support body extended between a first connecting portion 23 (described below) and a first fixing portion 24 (described below), whereas the second support member 30 is defined as a portion of the support body extended between a second connecting portion 33 (described below) and a second fixing portion 34 (described below). Discussed in this embodiment is an example of the support body constructed such that the first fixing portion 24 of the first support member 20 and the second fixing portion 34 of the second support member 30 are separated away from each other.

The first support member 20 extends from the base portion 10 to support the base portion 10. According to the example shown in FIG. 2, the first support member 20 extends from a side surface 10c of the base portion 10. The first support member 20 has the first connecting portion 23 connected with the base portion 10. In other words, the first connecting portion 23 is the root of the first support member 20 at the junction with the base portion 10.

The first support member 20 has the first fixing portion 24. The first fixing portion 24 is disposed in the vicinity of the tip of the first support member 20. The first support member 20 can be fixed to an external unit such as a package and a circuit board via the first fixing portion 24. In other words, the first fixing portion 24 is a portion at which the first support member 20 is fixed to an external unit such as a package and a circuit board. According to the example shown in FIG. 2, the base portion 10 is disposed between the first fixing portion 24 and the movable portion 14.

According to the example shown in the figures, the first support member 20 has a bended structure which includes an extended portion 21a extended in the −X direction from the base portion 10 (from the first connecting portion 23), an extended portion 21b extended in the −Y direction from the extended portion 21a, and an extended portion 21c extended in the +X direction from the extended portion 21b. The extended portion 21c has the first fixing portion 24. In other words, the first support member 20 bends in the range of extension from the base portion 10 to the first fixing portion 24. The bended structure in this context refers to a shape not linear but folded, curved, or other non-linear shapes.

The first support member 20 is allowed to have bended portions 22a and 22b (first bended portions 22a and 22b) constituting a curved structure in the range of extension from the base portion 10 to the first fixing portion 24. According to the example shown in the figures, the bended portion 22a is produced by connection between the extended portion 21a and the extended portion 21b. The bended portion 22b is produced by connection between the extended portion 21b and the extended portion 21c.

The second support member 30 extends from the base portion 10 to support the base portion 10. According to the example shown in the figures, the second support member 30 extends from a side surface 10d of the base portion 10. The side surface 10d is a surface facing to the side opposite to the side surface 10c of the base portion 10 (opposite side of the side surface 10c). The second support member 30 has the second connecting portion 33 connected with the base portion 10. In other words, the second connecting portion 33 corresponds to the root of the second fixing portion 30 at the junction with the base portion 10.

The second support member 30 has the second fixing portion 34. The second fixing portion 34 is disposed in the vicinity of the tip of the second support member 30. The second support member 30 can be fixed to an external unit such as a package via the second fixing portion 34. In other words, the second fixing portion 34 is a portion at which the second support member 30 is fixed to a external unit such as a package. According to the example shown in FIG. 2, the base portion 10 is disposed between the second fixing portion 34 and the movable portion 14.

According to the example shown in the figures, the second support member 30 has a bended structure which includes an extended portion 31a extended in the +X direction from the base portion 10 (from the second connecting portion 33), an extended portion 31b extended in the −Y direction from the extended portion 31a, and an extended portion 31c extended in the −X direction from the extended portion 31b. The extended portion 31c has the second fixing portion 34. In other words, the second support member 30 bends in the range of extension from the base portion 10 to the second fixing portion 34.

The second support member 30 is allowed to have bended portions 32a and 32b (second bended portions 32a and 32b) constituting a curved structure in the range of extension from the base portion 10 to the second fixing portion 34. According to the example shown in the figures, the bended portion 32a is produced by connection between the extended portion 31a and the extended portion 31b. The bended portion 32b is produced by connection between the extended portion 31b and the extended portion 31c.

A distance L1 between the first fixing portion 24 and the second fixing portion 34 is shorter than a distance L2 between the first connecting portion 23 and the second connecting portion 33. The support members 20 and 30 may be disposed symmetric with respect to a center axis (not shown) extending in parallel with the Y axis and corresponding to an axis passing through a center of gravity G of the physical quantity detection device 100. According to the example shown in the figures, the support members 20 and 30 are disposed in a line along the X axis.

According to this embodiment and other embodiments described below, the tip of the first support member 20 and the tip of the second support member 30 may be connected with each other as long as the distance L1 is shorter than the distance L2, in an alternative arrangement not specifically depicted. More specifically, the support body may be constituted by a one-piece component containing the first support member 20 and the second support member 30 whose tips separated in the example shown in FIG. 1 are connected with each other. According to this structure, the positional relationship between the first fixing portion 24 and the second fixing portion 34 does not easily change at the time of fixation of the first fixing portion 24 and the second fixing portion 34 to an external unit. Thus, a stress which may be produced depending on the assembly accuracy of the physical quantity detection device 100 is difficult to be produced.

However, when a clearance is left between the first fixing portion 24 of the first support member 20 and the second fixing portion 34 of the second support member 30 as illustrated in FIG. 1, a part of the base portion 10 is allowed to be sandwiched between the first and second fixing portions 24 and 34. In this case, the support body is not located in the direction in which the base portion 10 and the movable portion 14 are arranged in a line. Accordingly, the size of the physical quantity detection device 100 in this direction can be reduced.

The number of at least either the first fixing portion 24 or the second fixing portion 34 may be plural as long as the distance L1 is shorter than the distance L2. This structure can increase the fixing strength between the external unit and the physical quantity detection device 100 required to positively raise its weight around the movable portion 14 by the use of the masses 50, 52, 54, and 56, for example. Thus, the reliability of the device such as shock resistance improves.

The base portion 10, the joint 12, the movable portion 14, the first support member 20, and the second support member 30 are produced from a crystal substrate cut from a raw crystal ore or the like at predetermined angles and patterned by photolithography and etching to constitute a structure 101 containing these components 10, 12, 14, 20, and 30 as one body. The materials of the base portion 10, the joint 12, the movable portion 14, and the support members 20 and 30 are not limited to crystal but may be glass or semiconductor materials such as silicon.

The physical quantity detection element 40 stretches over the base portion 10 and the movable portion 14. The physical quantity detection element 40 is allowed to contain at least oscillation beams 41a and 41b corresponding to a detection unit, and bases 42a and 42b.

The detection unit is only required to lie between the base 42a and the base 42b and change physical quantity detection information generated from the detection unit when receiving a force produced between the base 42a and the base 42b. According to this embodiment, the oscillation beams 41a and 41b extend between the base 42a and the base 42b along the extension direction of the movable portion 14 (i.e., along the Y axis), for example. Each of the oscillation beams 41a and 41b has a prism shape, for example. When a driving signal (alternating current voltage) is applied to oscillation electrodes (not shown) provided on the oscillation beams 41a and 41b, the oscillation beams 41a and 41b oscillate and bend away from and close to each other along the X axis.

The bases 42a and 42b are connected with both ends of the oscillation beams 41a and 41b. According to the example shown in the figures, the base 42a is fixed to a main surface 10a of the base portion 10 via a junction member 60, while the base 42b is fixed to the main surface 14a of the movable portion 14 (the main surface of the movable portion 14 on the same side as the main surface 10a of the base portion 10) via another junction member 60. The junction members 60 are made of glass having a low melting point, and an Au/Sn alloy coating capable of achieving eutectic bonding.

Predetermined clearances are provided between the base portion 10 and the oscillation beams 41a and 41b and between the movable portion 14 and the oscillation beams 41a and 41b so as to avoid contacts between the oscillation beams 41a and 41b and the base portion 10 and the movable portion 14 at the time of displacement of the movable portion 14. These clearances may be controlled by the thickness of the junction members 60, for example.

A recess (not shown) may be formed by half-etching in the main surface 14a of the movable portion 14 at a position between the junction member 60 and the oscillation beams 41a and 41b in the plan view. This structure allows the junction member 60 to be received by the recess when the junction member projects from the predetermined position, thereby preventing adhesion of the junction member 60 to the oscillation beams 41a and 41b.

The physical quantity detection element 40 has the two oscillation beams 41a and 41b, and a pair of the bases 42a and 42b as explained above. In other words, the physical quantity detection element 40 can be called a double-ended tuning fork element (double-ended type oscillation element).

The physical quantity detection element 40 is formed from a crystal substrate cut from a raw crystal ore or the like at predetermined angles and patterned by photolithography and etching, for example. This structure produces the oscillation beams 41a and 41b and the bases 42a and 42b as integral components.

The material of the physical quantity detection element 40 is not limited to crystal but may be made of lithium tantalate (LiTaO$_3$), lithium tetraborate (Li$_2$B$_4$O$_7$), lithium niobate (LiNbO$_3$), lead zirconate titanate (PZT), zinc oxide (ZnO), aluminum nitride (AlN) or other piezoelectric materials, or semiconductor materials such as silicon coated with zinc oxide (ZnO), aluminum nitride (AlN) or other piezoelectric substances. It is preferable, however, that the physical quantity detection element 40 is made of the same material as the materials of the base portion 10 and the movable portion 14 considering reduction of the difference in the coefficient of linear expansion between the physical quantity detection element 40 and the base portion 10 and the movable portion 14.

Extension electrodes 44a and 44b are provided on the base 42a of the physical quantity detection element 40, for example. The extension electrodes 44a and 44b are electrically connected with oscillation electrodes (not shown) provided on the oscillation beams 41a and 41b.

The extension electrodes 44a and 44b are electrically connected with connection terminals 46a and 46b provided on the main surface 10a of the base portion 10 via metal wires 48 made of Au, Al or other metals. More specifically, the extension electrode 44a is electrically connected with the connection terminal 46a, while the extension electrode 44b is electrically connected with the connection terminal 46b. The connection terminals 46a and 46b are electrically connected with external connection terminals 49a and 49b via not-shown wirings. More specifically, the connection terminal 46a is electrically connected with the external connection terminal 49a, while the connection terminal 46b is electrically connected with the external connection terminal 49b. The external connection terminals 49a and 49b are disposed on the surfaces of the support members 20 and 30 on the side attached to the package or the like (surfaces on the main surface 10b side of the base portion 10) at positions overlapping with the fixing portions 24 and 34 in the plan view.

Each of the oscillation electrodes, the extension electrodes 44a and 44b, the connection terminals 46a and 46b, and the external connection terminals 49a and 49b is constituted by a laminated body having a Cr layer as a base on which an Au layer is laminated, for example. Each of the oscillation electrodes, the extension electrodes 44a and 44b, the connection terminals 46a and 46b, and the external connection terminals 49a and 49b is produced by patterning a film of a conductive layer (not shown) formed by sputtering, for example.

The masses 50, 52, 54, and 56 are provided on the main surfaces 14a and 14b of the movable portion 14 via junction members 62, for example. More specifically, the masses 50 and 52 are disposed on the main surface 14a, whereas the masses 54 and 56 are disposed on the main surface 14b. The masses 50, 52, 54, and 56 are made of metal such as Cu and Au, for example. The masses 50, 52, 54, and 56 can increase the detection sensitivity to acceleration applied to the physical quantity detection device 100.

The junction members 62 are constituted by thermosetting adhesives of the silicon resin family, for example. It is preferable that the junction members 62 are applied to a part of the movable portion 14 and a part of each of the masses 50, 52, 54, and 56 for connection therebetween for the purpose of thermal stress reduction.

The masses 50 and 52 may be combined into one mass (not shown), and similarly the masses 54 and 56 may be combined into one mass (not shown). The masses may be provided only on either one of the main surfaces 14a and 14b.

Figure 4:
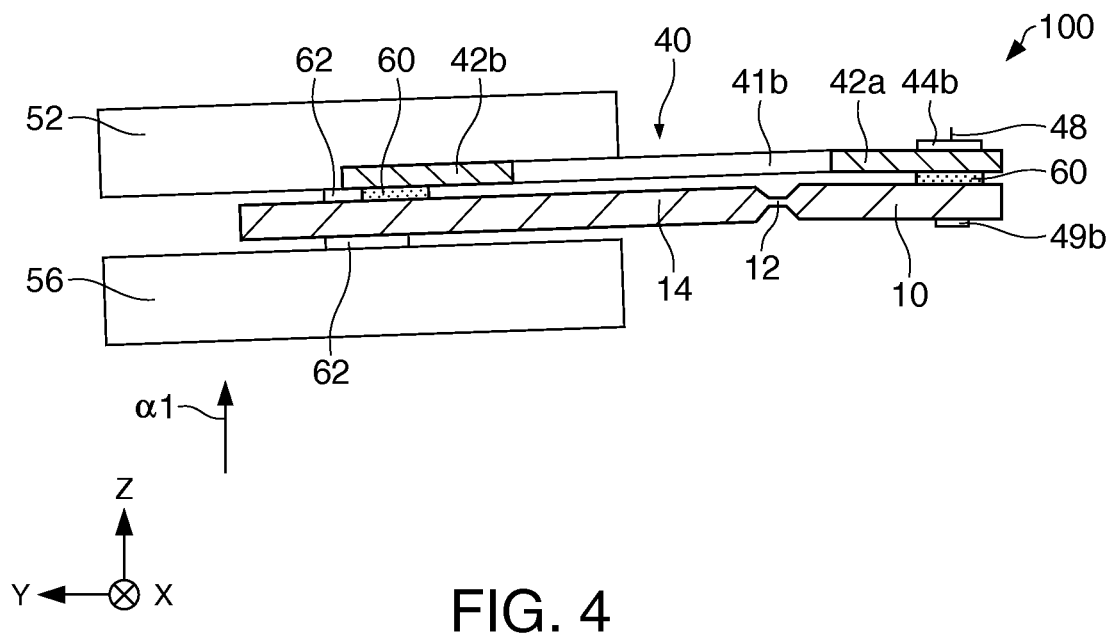
FIG. 4 is a cross-sectional view illustrating the operation of the physical quantity detection device according to the first embodiment.
Figure 5:
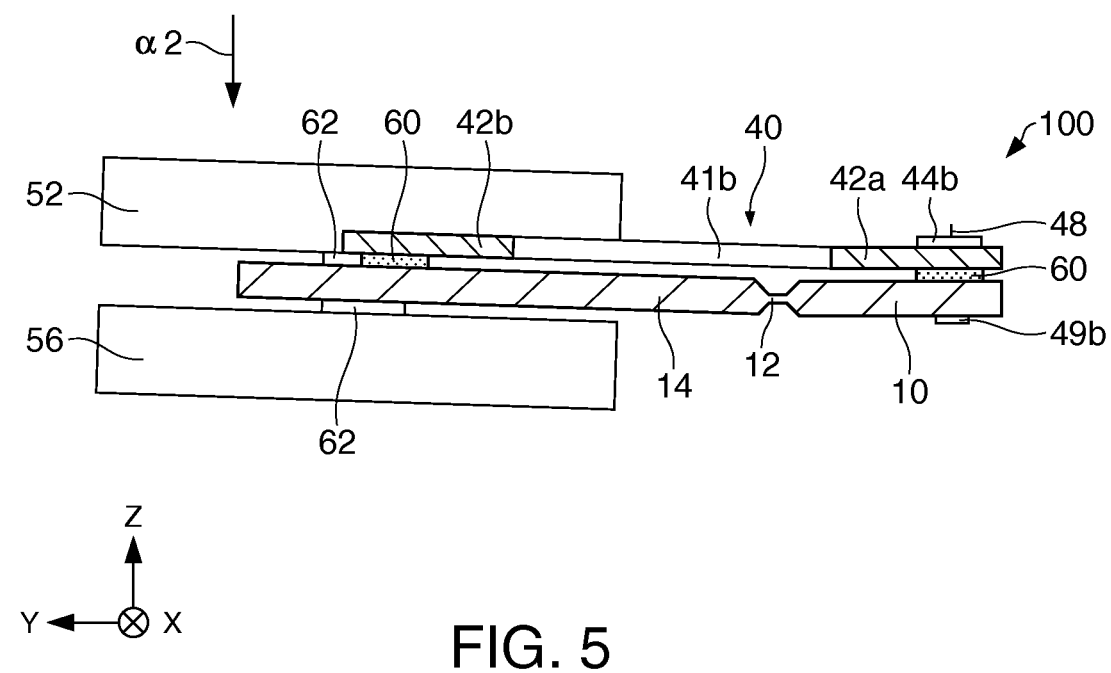
FIG. 5 is a cross-sectional view illustrating the operation of the physical quantity detection device according to the first embodiment.

The operation of the physical quantity detection device 100 is now explained. FIGS. 4 and 5 are cross-sectional views illustrating the operation of the physical quantity detection device 100.

When an acceleration in the direction of an arrow α1 (+Z direction) is applied to the physical quantity detection device 100 as illustrated in FIG. 4, a force in the −Z direction acts on the movable portion 14 and displaces the movable portion 14 in the −Z direction with the fulcrum located on the joint 12. As a result, a force acts on the physical quantity detection element 40 in such a direction that the bases 42a and 42b move away from each other along the Y axis, generating a tensile stress on the oscillation beams 41a and 41b. Thus, the oscillation frequency (resonance frequency) of the oscillation beams 41a and 41b increases.

On the other hand, when an acceleration in the direction of an arrow α2 (−Z direction) is applied to the physical quantity detection device 100 as illustrated in FIG. 5, a force in the +Z direction acts on the movable portion 14 and displaces the movable portion 14 in the +Z direction with the fulcrum located on the joint 12. As a result, a force acts on the physical quantity detection element 40 in such a direction that the bases 42a and 42b move close to each other along the Y axis, generating a compressive stress on the oscillation beams 41a and 41b. Thus, the oscillation frequency (resonance frequency) of the oscillation beams 41a and 41b decreases.

The physical quantity detection device 100 detects these changes of the resonance frequency of the physical quantity detection element 40 for physical quantity detection. More specifically, the physical quantity detection device 100 determines the acceleration applied thereto based on the changes of the resonance frequency detected and converted into numerical values in a lookup table or the like established in accordance with the rates of the changes.

In the case of the physical quantity detection device 100 incorporated in an inclinometer, the direction of the gravitational acceleration applied to the inclinometer varies according to the change of the position of the inclination, thereby producing the tensile stress and the compressive stress on the oscillation beams 41a and 41b. As a result, the resonance frequency of the oscillation beams 41a and 41b changes.

According to the example described herein, the physical quantity detection element 40 is constituted by a so-called double-ended tuning fork element. However, the physical quantity detection element 40 may be any types of device as long as the resonance frequency changes according to displacement of the movable portion 14.

The physical quantity detection device 100 according to the first embodiment provides the following advantages.

According to the physical quantity detection device 100, the distance L1 between the first fixing portion 24 and the second fixing portion 34 is shorter than the distance L2 between the first connecting portion 23 (i.e., the root 23 of the first support member 20 at the junction with the base portion 10) and the second connecting portion 33 (i.e., the root 33 of the second support member 30 at the junction with the base portion 10). This structure prevents the physical quantity detection element 40 from receiving a stress produced on the structure 101 (structure including the base portion 10, the joint 12, the movable portion 14, and the support members 20 and 30) by the difference in the coefficient of linear expansion between the structure 101 and an external unit such as a package and a circuit board when the physical quantity detection device 100 is mounted on the external unit with the first fixing portion 24 and the second fixing portion 34 fixed thereto. Generally, the stress produced on the structure by the difference in the coefficient of linear expansion increases as the distance L1 between the first fixing portion and the second fixing portion becomes longer. However, the physical quantity detection device 100 which sets the distance L1 shorter than the distance L2 can reduce the stress produced on the structure 101 (such as the base portion 10) by the difference in the coefficient of linear expansion. Accordingly, the physical quantity detection device 100 can prevent transmission of this stress to the physical quantity detection element 40, thereby increasing the detection sensitivity.

According to the physical quantity detection device 100, the first support member 20 has a bended shape produced by the bended portions 22a and 22b in the range of extension from the base portion 10 to the first fixing portion 24. On the other hand, the second support member 30 has a bended shape produced by the bended portions 32a and 32b in the range of extension from the base portion 10 to the second fixing portion 34. Thus, the physical quantity detection device 100 can reduce a stress produced on the fixing portions 24 and 34 by fixation of the fixing portions 24 and 34 to an external unit such as a package (a stress produced by the difference in the coefficient of linear expansion between the fixing portions 24 and 34 and the package and a stress produced on an adhesive for bonding the fixing portions 24 and 34 to the package) prior to transmission of the stress to the physical quantity detection element 40.

1.2. MODIFIED EXAMPLE

1.2.1. First Modified Example

Figure 6:
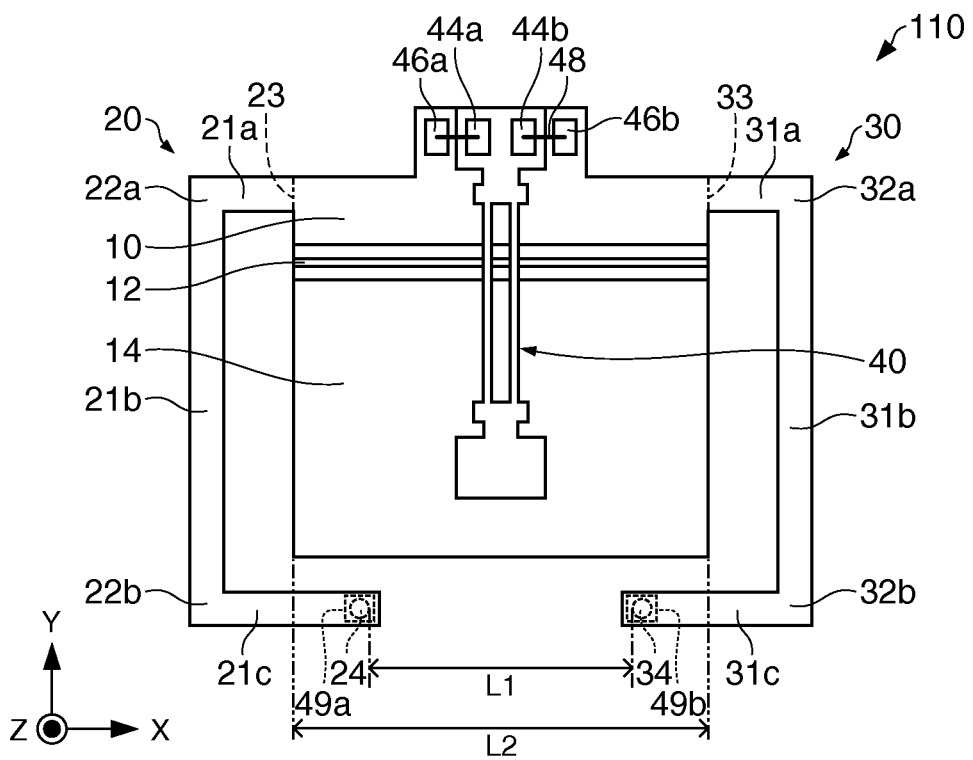
FIG. 6 is a plan view schematically illustrating a physical quantity detection device according to a first modified example of the first embodiment.

A physical quantity detection device according to a first modified example of the first embodiment is now explained with reference to the drawings. FIG. 6 is a plan view schematically illustrating a physical quantity detection device 110 according to the first modified example of the first embodiment. FIG. 6 and FIGS. 7 through 9 to be referred to below do not show the masses 50, 52, 54, and 56, and the junction members 62 for easy understanding of the figures.

The components and parts of the physical quantity detection device 110 having functions similar to those of the corresponding components and parts of the physical quantity detection device 100 have been given similar reference numbers, and the same detailed explanation is not repeated herein.

According to the example of the physical quantity detection device 100 shown in FIG. 2, the movable portion 14 extends in the +Y direction from the base portion 10 with the joint 12 provided between the movable portion 14 and the base portion 10. Moreover, the base portion 10 is interposed between the movable portion 14 and the fixing portions 24 and 34.

However, in the case of the physical quantity detection device 110 shown in FIG. 6, the movable portion 14 extends in the −Y direction from the base portion 10 with the joint 12 provided between the movable portion 14 and the base portion 10. Moreover, the movable portion 14 is interposed between the base portion 10 and the fixing portions 24 and 34.

According to the physical quantity detection device 110, the extended portion 21b of the first support member 20 and the extended portion 31b of the second support member 30 extend along the movable portion 14 with clearances left between the extended portion 21b and the movable portion 14 and between the extended portion 31b and the movable portion 14. According to the example shown in the figure, each of the length of the extended portion 21b in the Y axis direction and the length of the extended portion 31b in the Y axis direction is larger than the length of the movable portion 14 in the Y axis direction.

The physical quantity detection device 110 thus constructed can prevent transmission of the stress to the physical quantity detection element 40 similarly to the physical quantity detection device 100.

1.2.2. Second Modified Example

Figure 7:
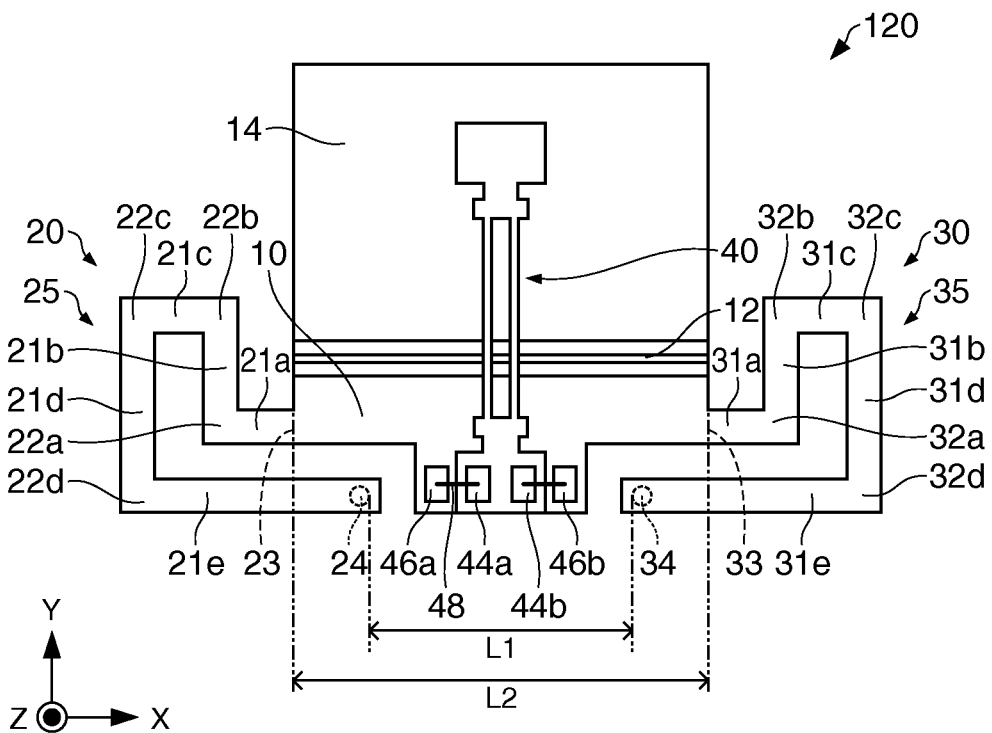
FIG. 7 is a plan view schematically illustrating a physical quantity detection device according to a second modified example of the first embodiment.

A physical quantity detection device according to a second modified example of the first embodiment is now explained with reference to the drawings. FIG. 7 is a plan view schematically illustrating a physical quantity detection device 120 according to the second modified example of the first embodiment.

The components and parts of the physical quantity detection device 120 having functions similar to those of the corresponding components and parts of the physical quantity detection device 100 have been given similar reference numbers, and the same detailed explanation is not repeated herein.

According to the physical quantity detection device 100 shown in FIG. 2, the first support member 20 has the two bended portions 22a and 22b, while the second support member 30 has the two bended portions 32a and 32b.

On the other hand, in the case of the physical quantity detection device 120 shown in FIG. 7, the first support member 20 has four bended portions 22a, 22b, 22c, and 22d (first bended portions 22a, 22b, 22c, and 22d) in the range of extension from the base portion 10 to the first fixing portion 24. Similarly, the second support member 30 has four bended portions 32a, 32b, 32c, and 32d (second bended portions 32a, 32b, 32c, and 32d) in the range of extension from the base portion 10 to the second fixing portion 34.

According to the example shown in FIG. 7, the first support member 20 has the extended portion 21a extended in the −X direction from the base portion 10, the extended portion 21b extended in the +Y direction from the extended portion 21a, the extended portion 21c extended in the −X direction from the extended portion 21b, an extended portion 21d extended in the −Y direction from the extended portion 21c, and an extended portion 21e extended in the +X direction from the extended portion 21d. The extended portion 21e has the first fixing portion 24.

The bended portion 22a is produced by connection between the extended portion 21a and the extended portion 21b. The bended portion 22b is produced by connection between the extended portion 21b and the extended portion 21c. The bended portion 22c is produced by connection between the extended portion 21c and the extended portion 21d. The bended portion 22d is produced by connection between the extended portion 21d and the extended portion 21e.

The first support member 20 is allowed to have a first reciprocating structure 25 constituted by the extended portions 21a, 21b, 21c, and 21d, and the bended portions 22a, 22b, and 22c. The first reciprocating structure 25 extends along the X axis (second axis), for example, as a direction crossing the Y axis, while reciprocating along the Y axis (first axis), for example, as a direction crossing the X axis. In other words, the first support member 20 is bended in a reciprocating manner in the range of extension from the base portion 10 to the first fixing portion 24.

According to the example shown in FIG. 7, the second support member 30 has the extended portion 31a extended in the +X direction from the base portion 10, the extended portion 31b extended in the +Y direction from the extended portion 31a, the extended portion 31c extended in the +X direction from the extended portion 31b, an extended portion 31d extended in the −Y direction from the extended portion 31c, and an extended portion 31e extended in the −X direction from the extended portion 31d. The extended portion 31e has the second fixing portion 34.

The bended portion 32a is produced by connection between the extended portion 31a and the extended portion 31b. The bended portion 32b is produced by connection between the extended portion 31b and the extended portion 31c. The bended portion 32c is produced by connection between the extended portion 31c and the extended portion 31d. The bended portion 32d is produced by connection between the extended portion 31d and the extended portion 31e.

The second support member 30 is allowed to have a second reciprocating structure 35 constituted by the extended portions 31a, 31b, 31c, and 31d, and the bended portions 32a, 32b, and 32c. The second reciprocating structure 35 extends along the X axis while reciprocating along the Y axis. In other words, the second support member 30 is bended in a reciprocating manner in the range of extension from the base portion 10 to the second fixing portion 34.

The numbers of the extended portions and the bended portions constituting the reciprocating structures 25 and 35 are not specifically limited to the numbers shown herein but may be changed as necessary.

According to the physical quantity detection device 120, the reciprocating structures 25 and 35 further reduce the stress produced on the fixing portions 24 and 34 by the fixation of the fixing portions 24 and 34 to an external unit such as a package prior to transmission of the stress to the physical quantity detection element 40. The reciprocating structures 25 and 35 may have elasticity, for example, so as to further decrease the stress produced on the fixing portions 24 and 34 prior to transmission of the stress to the physical quantity detection element 40.

1.2.3. Third Modified Example

Figure 8:
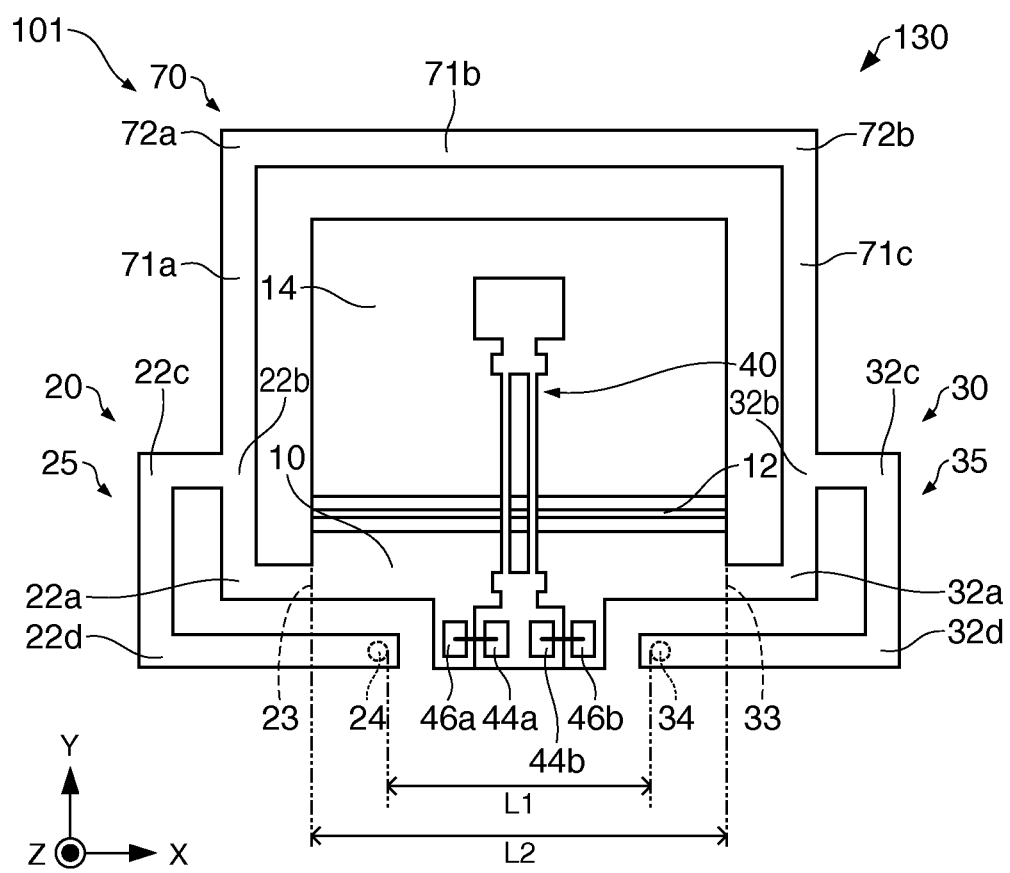
FIG. 8 is a plan view schematically illustrating a physical quantity detection device according to a third modified example of the first embodiment.

A physical quantity detection device according to a third modified example of the first embodiment is now explained with reference to the drawings. FIG. 8 is a plan view schematically illustrating a physical quantity detection device 130 according to the third modified example of the first embodiment.

The components and parts of the physical quantity detection device 130 having functions similar to those of the corresponding components and parts of the physical quantity detection device 120 have been given similar reference numbers, and the same detailed explanation is not repeated herein.

As illustrated in FIG. 8, the physical quantity detection device 130 has the reciprocating structures 25 and 35 similarly to the physical quantity detection device 120, and further has a frame 70 as a connection body. The physical quantity detection device 130 is different from the physical quantity detection device 100 shown in FIG. 2 in this point.

The frame 70 is provided along the movable portion 14 with a clearance left between the frame 70 and the movable portion 14, and is connected with the support members 20 and 30. The movable portion 14 is surrounded by the frame 70, the support members 20 and 30, and the base portion 10, for example. According to the example shown in the figure, the frame 70 has an extended portion 71a extended in the +Y direction from the bended portion 22b of the first support member 20, an extended portion 71b extended in the +X direction from the extended portion 71a, and an extended portion 71c extended in the −Y direction from the extended portion 71b and connected with the bended portion 32b of the second support member 30.

The frame 70 is allowed to have bended portions 72a and 72b. The bended portion 72a is produced by connection between the extended portion 71a and the extended portion 71b. The bended portion 72b is produced by connection between the extended portion 71b and the extended portion 71c.

The frame 70 is formed from a crystal substrate cut from a raw crystal ore or the like at predetermined angles and patterned by photolithography and etching to constitute a one body of the structure 101. The material of the frame 70 is not limited to crystal but may be glass or a semiconductor material such as silicon.

The physical quantity detection device 130 thus constructed can prevent transmission of the stress to the physical quantity detection element 40 similarly to the physical quantity detection device 100.

1.2.4. Fourth Modified Example

Figure 9:
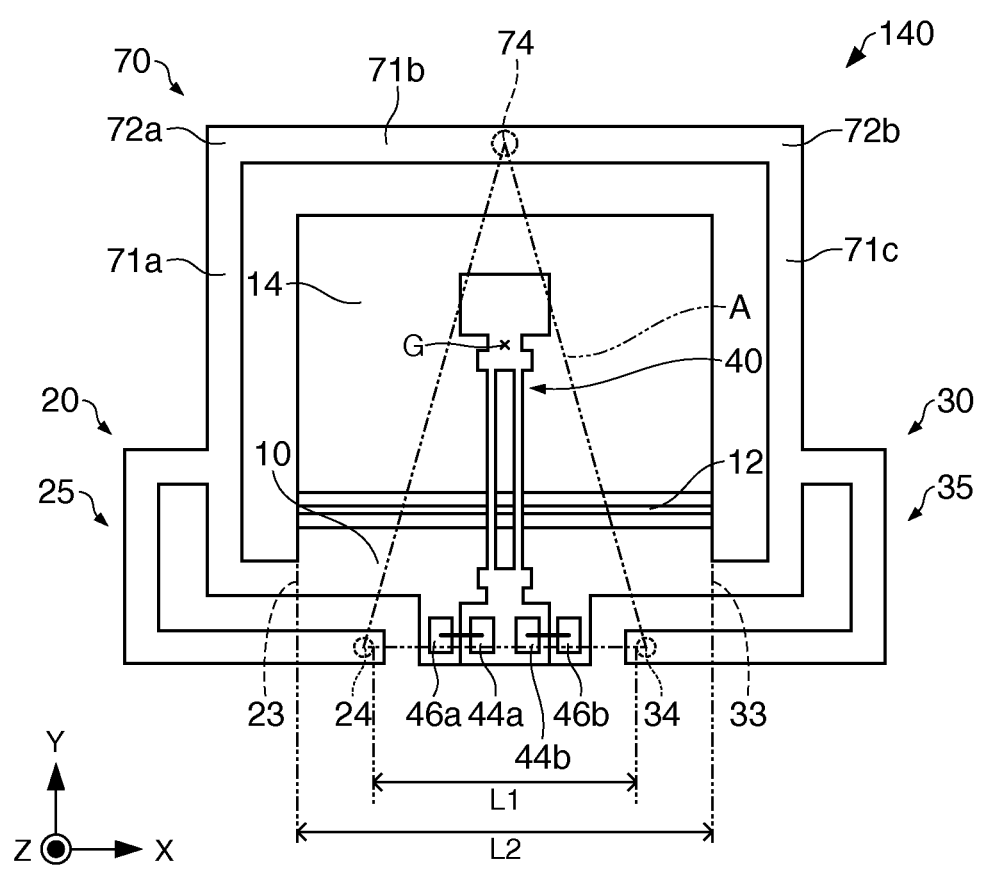
FIG. 9 is a plan view schematically illustrating a physical quantity detection device according to a fourth modified example of the first embodiment.

A physical quantity detection device according to a fourth modified example of the first embodiment is now explained with reference to the drawings. FIG. 9 is a plan view schematically illustrating a physical quantity detection device 140 according to the fourth modified example of the first embodiment.

The components and parts of the physical quantity detection device 140 having functions similar to those of the corresponding components and parts of the physical quantity detection device 130 have been given similar reference numbers, and the same detailed explanation is not repeated herein.

As illustrated in FIG. 9, the physical quantity detection device 140 has the reciprocating structures 25 and 35, and the frame 70 as a connection body similarly to the physical quantity detection device 130, for example, and further has a third fixing portion 74 of the frame 70. The physical quantity detection device 140 is different from the physical quantity detection device 100 shown in FIG. 2 in this point.

The third fixing portion 74 is provided on the extended portion 71b of the frame 70. The frame 70 can be fixed to an external unit such as a package via the third fixing portion 74. Thus, the third fixing portion 74 is a portion at which the frame 70 is fixed.

A center of gravity G of the physical quantity detection device 140 is located within a range A surrounded by the fixing portions 24, 34, and 74 in the plan view as illustrated in FIG. 9. More specifically, the center of gravity G is located within the range A (area A) surrounded by a line connecting the center of the first fixing portion 24 and the center of the second fixing portion 34, a line connecting the center of the second fixing portion 34 and the center of the third fixing portion 74, and a line connecting the center of the third fixing portion 74 and the center of the first fixing portion 24 in the plan view.

As noted above, the center of gravity G of the physical quantity detection device 140 is located within the range A surrounded by the fixing portions 24, 34, and 74. According to this structure, the physical quantity detection device 140 can be fixed to an external unit such as a package in a stable position without inclination (distortion) in any directions. For example, when the connecting portion (root) of the support member is distorted at the time of displacement of the movable portion to which acceleration is applied, the acceleration detection sensitivity lowers. Moreover, the support member may be broken by the distortion, in which case the reliability deteriorates. The physical quantity detection device 140 capable of preventing distortion in the foregoing manner can avoid these problems.

According to the physical quantity detection device 140, the frame 70 is allowed to have the bended portion 72a in the range of extension from the third fixing portion 74 to the first support member 20, and the bended portion 72b in the range of extension from the third fixing portion 74 to the second support member 30. Thus, the physical quantity detection device 140 can reduce a stress produced on the third fixing portion 74 by fixation of the third fixing portion 74 to an external unit such as a package prior to transmission of the stress to the physical quantity detection element 40.

2. Second Embodiment

2.1. Physical Quantity Detection Device

Figure 10:
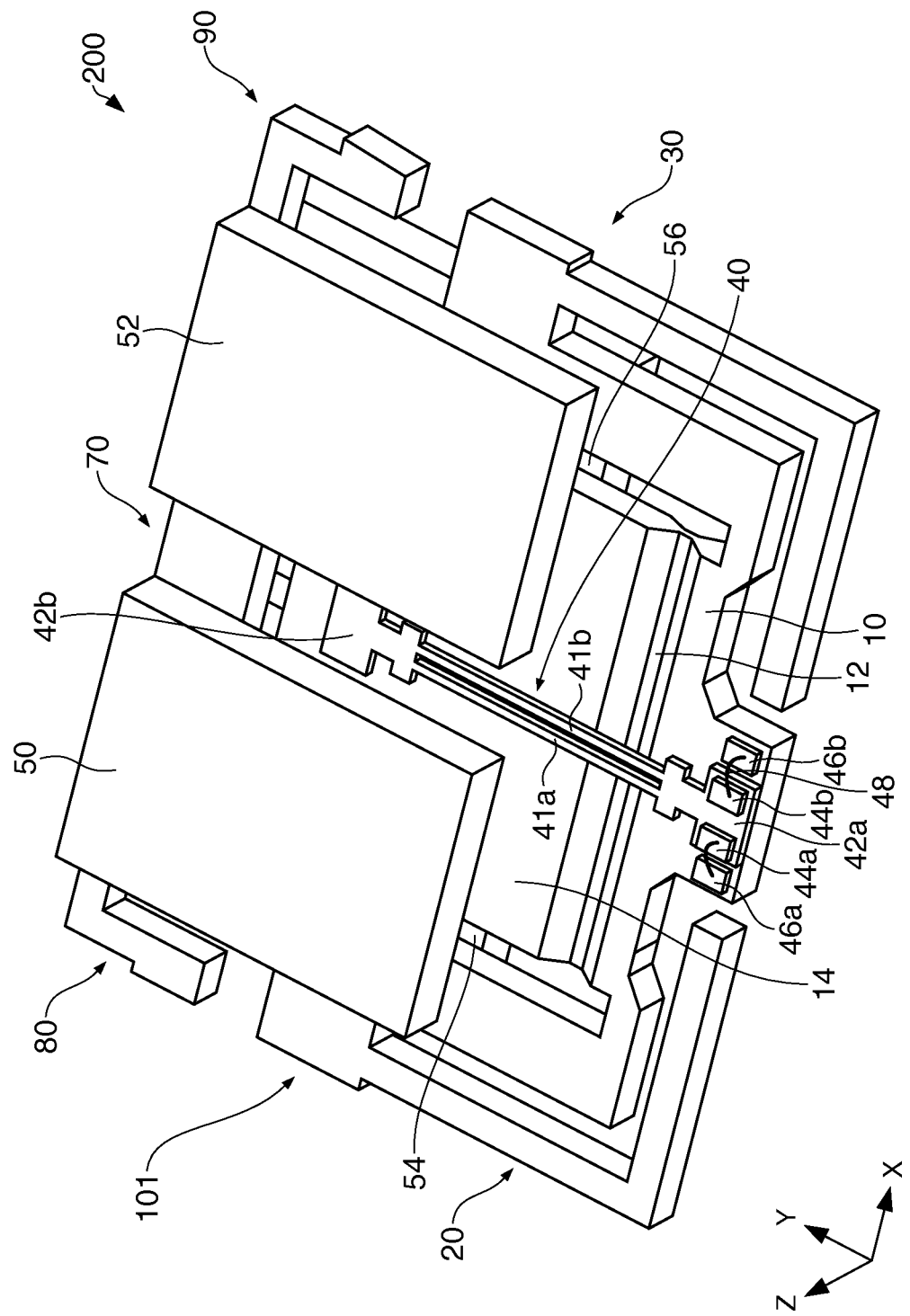
FIG. 10 is a perspective view schematically illustrating a physical quantity detection device according to a second embodiment.
Figure 11:
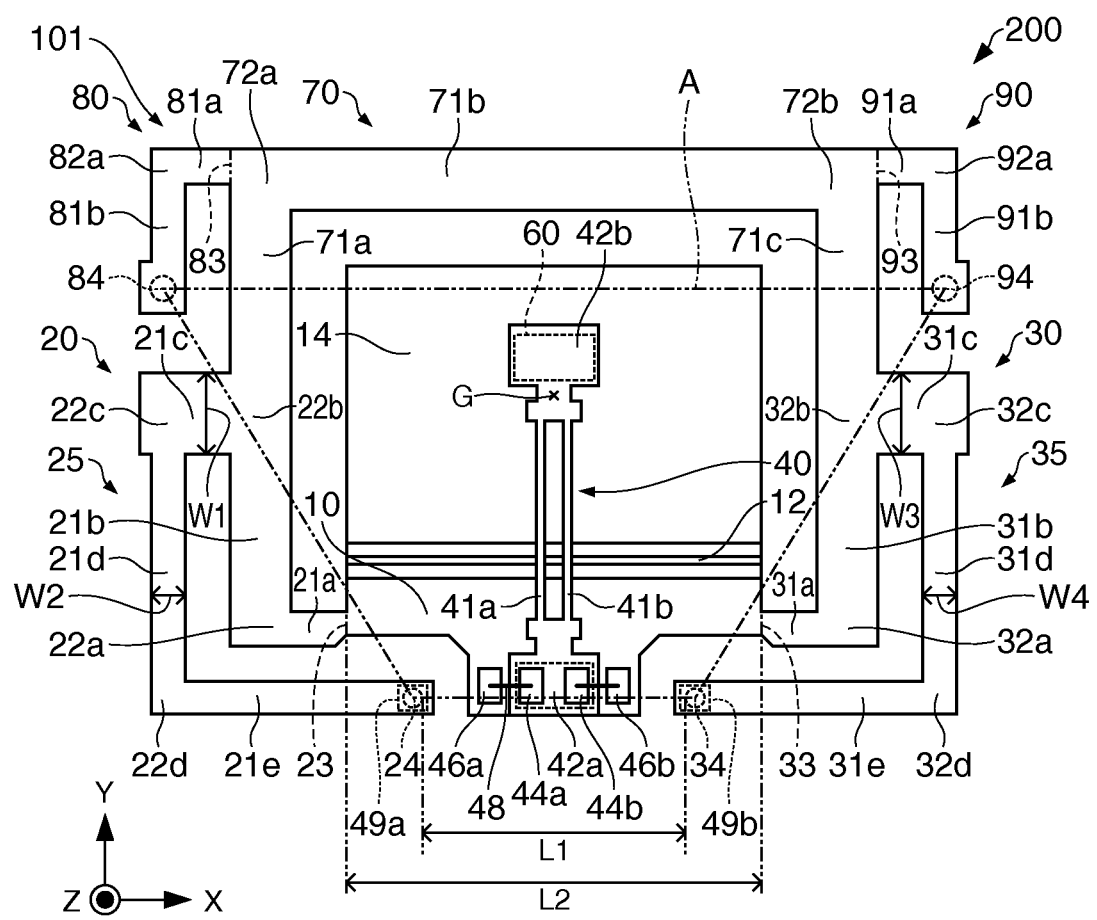
FIG. 11 is a plan view schematically illustrating the physical quantity detection device according to the second embodiment.

A physical quantity detection device according to a second embodiment is now described with reference to the drawings. FIG. 10 is a perspective view schematically illustrating a physical quantity detection device 200 according to the second embodiment. FIG. 11 is a plan view schematically illustrating the physical quantity detection device 200 according to the second embodiment. FIG. 11 and FIGS. 12 through 15 to be referred to below do not show the masses 50, 52, 54, and 56 and the junction members 62 for easy understanding of the figures.

The components and parts of the physical quantity detection device 200 having functions similar to those of the corresponding components and parts of the physical quantity detection devices 100 through 140 have been given similar reference numbers, and the same detailed explanation is not repeated herein.

As illustrated in FIGS. 10 and 11, the physical quantity detection device 200 has the reciprocating structures 25 and 35 and the frame 70 as a connection body similarly to the physical quantity detection device 130, and further has a third support member 80 and a fourth support member 90. The physical quantity detection device 200 is different from the physical quantity detection device 100 shown in FIG. 2 in this point.

The third support member 80 extends from the frame 70 to support the base portion 10 via the frame 70. The third support member 80 has a third connecting portion 83 connected with the frame 70. According to the example shown in the figures, the third connecting portion 83 is connected with the bended portion 72a of the frame 70. In other words, the third connecting portion 83 corresponds to the root of the third support member 80 at the junction with the frame 70.

The third support member 80 has a fourth fixing portion 84. The fourth fixing portion 84 is disposed in the vicinity of the tip of the third support member 80. The third support member 80 can be fixed to an external unit such as a package via the fourth fixing portion 84. In other words, the fourth fixing portion 84 corresponds to a portion at which the third support member 80 is fixed.

According to the example shown in the figures, the third support member 80 has an extended portion 81a extended in the −X direction from the frame 70 (third connecting portion 83), and an extended portion 81b extended in the −Y direction from the extended portion 81a. The extended portion 81b has the fourth fixing portion 84. The fourth fixing portion 84 is disposed on the −X side of the frame 70.

The third support member 80 is allowed to have a bended portion 82a bended in the range of extension from the frame 70 to the fourth fixing portion 84. According to the example shown in the figures, the bended portion 82a is produced by connection between the extended portion 81a and the extended portion 81b.

The fourth support member 90 extends from the frame 70 to support the base portion 10 via the frame 70. The fourth support member 90 has a fourth connecting portion 93 connected with the frame 70. According to the example shown in the figures, the fourth connecting portion 93 is connected with the bended portion 72b of the frame 70. In other words, the fourth connecting portion 93 corresponds to the root of the fourth support member 90 at the junction with the frame 70.

The fourth support member 90 has a fifth fixing portion 94. The fifth fixing portion 94 is disposed in the vicinity of the tip of the fourth support member 90. The fourth support member 90 can be fixed to an external unit such as a package via the fifth fixing portion 94. In other words, the fifth fixing portion 94 corresponds to a portion at which the fourth support member 90 is fixed.

According to the example shown in the figure, the fourth support member 90 has an extended portion 91a extended in the +X direction from the frame 70 (fourth connecting portion 93), and an extended portion 91b extended in the −Y direction from the extended portion 91a. The extended portion 91b has the fifth fixing portion 94. The fifth fixing portion 94 is disposed on the +X side of the frame 70.

The fourth support member 90 is allowed to have a bended portion 92a bended in the range of extension from the frame 70 to the fifth fixing portion 94. According to the example shown in the figure, the bended portion 92a is produced by connection between the extended portion 91a and the extended portion 91b.

A center of gravity G of the physical quantity detection device 200 is located within a range A surrounded by the fixing portions 24, 34, 84, and 94 in the plan view as illustrated in FIG. 11. More specifically, the center of gravity G is located within the range A (area A) surrounded by a line connecting the center of the first fixing portion 24 and the center of the second fixing portion 34, a line connecting the center of the second fixing portion 34 and the center of the fifth fixing portion 94, a line connecting the center of the fifth fixing portion 94 and the center of the fourth fixing portion 84, and a line connecting the center of the fourth fixing portion 84 and the center of the first fixing portion 24.

According to the example shown in the figures, a width W1 (length in the Y axis direction, i.e., width along the Y axis direction) of the extended portion 21c (first extended portion 21c) of the first support member 20 is larger than a width W2 (length in the X axis direction, i.e., width along the X axis direction) of the extended portion 21d (second extended portion 21d) connected with the extended portion 21c. The extended portion 21c is disposed closer to the base portion 10 than the position of the extended portion 21d with respect to the base portion 10 in the route of the first support member 20 extended from the base portion 10 to the first fixing portion 24. Moreover, the width (length in the X axis direction) of the extended portion 21b is larger than the width of the extended portion 21d. The extended portion 21d lies in the range of extension from the extended portion 21c to the first fixing portion 24, and extends from the extended portion 21c in a first direction (Y axis direction) different from a first extension direction (X axis direction) of the extended portion 21c.

On the other hand, according to the example shown in the figures, a width W3 (length in the Y axis direction, i.e., width along the Y axis direction) of the extended portion 31c (third extended portion 31c) of the second support member 30 is larger than a width W4 (length in the X axis direction, i.e., width along the X axis direction) of the extended portion 31d (fourth extended portion 31d) connected with the extended portion 31c. The extended portion 31c is disposed closer to the base portion 10 than the position of the extended portion 31d with respect to the base portion 10 in the route of the second support member 30 extended from the base portion 10 to the second fixing portion 34. Moreover, the width (length in the X axis direction) of the extended portion 31b is larger than the width of the extended portion 31d. The extended portion 31d lies in the range of extension from the extended portion 31c to the second fixing portion 34, and extends from the extended portion 31c in a second direction (Y axis direction) different from a second extension direction (X axis direction) of the extended portion 31c.

Thus, the first support member 20 and the second support member 30 have extended portions (extended portions 21c and 31c) extended along the rotation axis, and extended portions (extended portions 21d and 31d) projected from the extended portions 21c and 31c and extended in a direction crossing the rotation axis in the range of extension from the extended portions 21c and 31c to the fixing portions (first and second fixing portions).

The widths W1 and W3 of the extended portions 21c and 31c are larger than the corresponding widths W2 and W4 of the extended portions 21d and 31d. In this case, it is preferable that the widths W1 and W3 of the extended portions 21c and 31c are also larger than the corresponding widths W2 and W4 of the extended portions 21d and 31d at the junctions between the extended portions 21c and 31c and the extended portions 21d and 31d.

The support members 80 and 90 are formed from a crystal substrate cut from a raw crystal ore or the like at predetermined angles and patterned by photolithography and etching to constitute a one body of the structure 101. The materials of the support members 80 and 90 are not limited to crystal but may be glass or a semiconductor material such as silicon.

The physical quantity detection device 200 according to the second embodiment provides the following advantages.

The center of gravity G of the physical quantity detection device 200 is located within the range A surrounded by the fixing portions 24, 34, 84, and 94. According to this structure, the physical quantity detection device 200 can be fixed to an external unit such as a package in a stable position without inclination (distortion) in any directions. The physical quantity detection device 200 has the support members 80 and 90 in addition to the support members 20 and 30. In this case, the number of the fixing portions increases, in which condition the physical quantity detection device 200 is fixed in a further stable position, and allowed to achieve further secure prevention of distortion. Accordingly, the acceleration detection sensitivity and the reliability do not deteriorate.

According to the physical quantity detection device 200, the third support member 80 is allowed to have the bended portion 82a in the range of extension from the frame 70 to the third fixing portion 84, and the fourth support member 90 is allowed to have the bended portion 92a in the range of extension from the frame 70 to the fourth fixing portion 94. Thus, the physical quantity detection device 200 can reduce a stress produced on the fixing portions 84 and 94 by fixation of the fixing portions 84 and 94 to an external unit such as a package prior to transmission of the stress to the physical quantity detection element 40.

According to the physical quantity detection device 200, the first support member 20 is allowed to have the extended portion 21c having the width W1 larger than the width W2 of the extended portion 21d. Moreover, the second support member 30 is allowed to have the extended portion 31c having the width W3 larger than the wide W4 of the extended portion 31d. According to this structure, the extended portions 21c and 31c have higher rigidity than the rigidity of the extended portions 21d and 31d. In this case, the extended portions 21d and 31d more easily bend when acceleration is applied to the physical quantity detection device 200, thereby avoiding distortion of the extended portions 21c and 31c. As a result, distortion of the connecting portions 23 and 33 of the support members 20 and 30 decreases, which prevents deterioration of the acceleration detection sensitivity and the reliability.

According to an alternative structure (not shown), the width of the extended portion 81a (length in the Y axis direction) may be larger than the width of the extended portion 81b (length in the X axis direction), while the width of the extended portion 91a (length in the Y axis direction) may be larger than the width of the extended portion 91b (length in the X axis direction). This structure can avoid distortion of the extended portions 81a and 91a produced when acceleration is applied to the physical quantity detection device 200 in the direction along the Z axis.

The physical quantity detection device 200 may be supported by the first support member 20, the second support member 30, and the third support member 80 without the fourth support member 90. In this case, the center of gravity lies within the range surrounded by the first fixing portion, the second fixing portion, and the fourth fixing portion as viewed in the plan view. However, the structure which has three or more support members is more advantageous in view of stabilization of the mounting position of the physical quantity detection device 200 when mounted on an external unit, and reduction of the stress by decreasing the thicknesses of the respective support members.

2.2. MODIFIED EXAMPLE

2.2.1. First Modified Example

Figure 12:
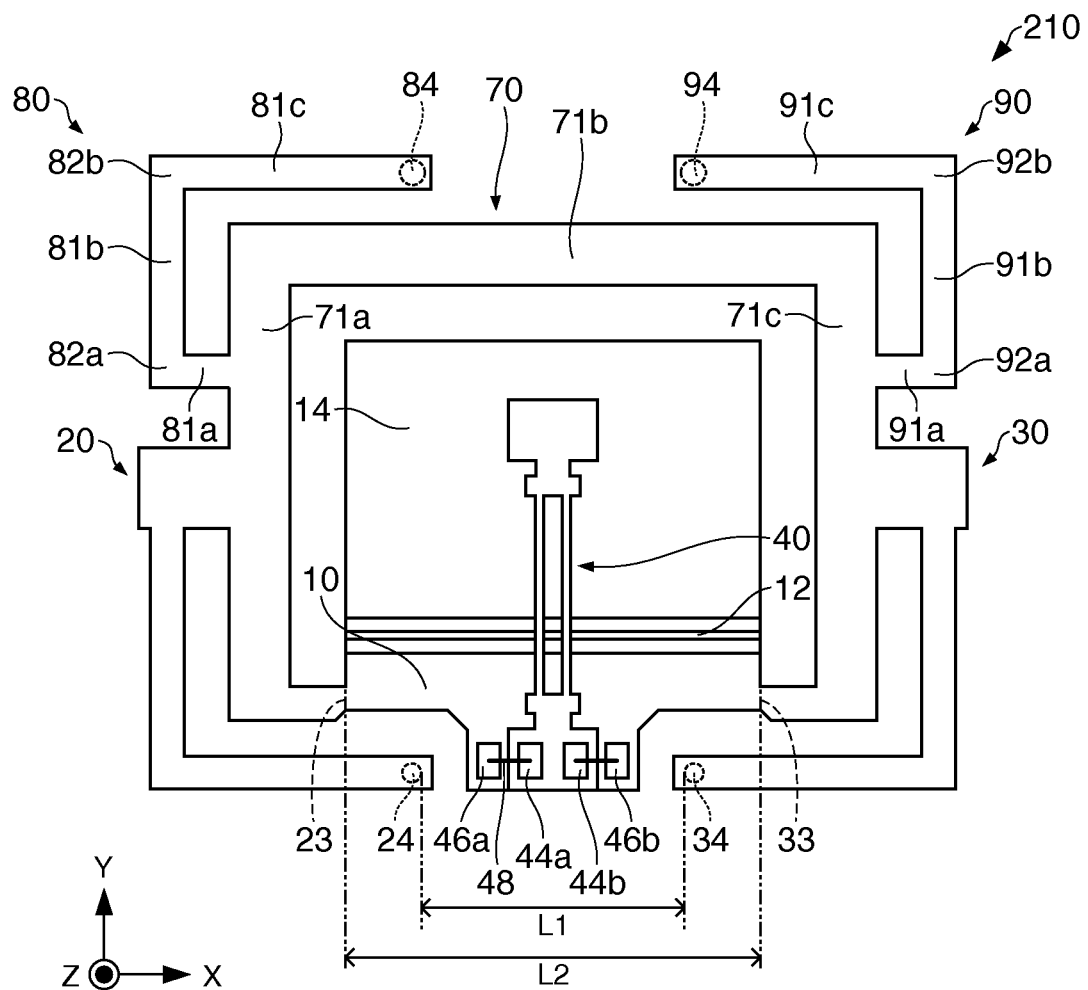
FIG. 12 is a plan view schematically illustrating a physical quantity detection device according to a first modified example of the second embodiment.

A physical quantity detection device according to a first modified example of the second embodiment is now explained with reference to the drawings. FIG. 12 is a plan view schematically illustrating a physical quantity detection device 210 according to the first modified example of the second embodiment.

The components and parts of the physical quantity detection device 210 having functions similar to those of the corresponding components and parts of the physical quantity detection device 200 have been given similar reference numbers, and the same detailed explanation is not repeated herein.

The physical quantity detection device 210 is different from the physical quantity detection device 200 in the shapes of the third support member 80 and the fourth support member 90.

As illustrated in FIG. 12, the third support member 80 has the extended portion 81a extended in the −X direction from the extended portion 71a of the frame 70, the extended portion 81b extended in the +Y direction from the extended portion 81a, and an extended portion 81c extended in the +X direction from the extended portion 81b. The extended portion 81c has the fourth fixing portion 84. The fourth fixing portion 84 is disposed on the +Y side of the frame 70.

The third support member 80 further has the bended portion 82a produced by connection between the extended portion 81a and the extended portion 81b, and a bended portion 82b produced by connection between the extended portion 81b and the extended portion 81c.

On the other hand, the fourth support member 90 has the extended portion 91a extended in the +X direction from the extended portion 71c of the frame 70, the extended portion 91b extended in the +Y direction from the extended portion 91a, and an extended portion 91c extended in the −X direction from the extended portion 91b. The extended portion 91c has the fifth fixing portion 94. The fifth fixing portion 94 is disposed on the +Y side of the frame 70.

The fourth support member 90 further has the bended portion 92a produced by connection between the extended portion 91a and the extended portion 91b, and a bended portion 92b produced by connection between the extended portion 91b and the extended portion 91c.

The physical quantity detection device 210 thus constructed has the support members 80 and 90 provided with a larger number of the bended portions than that of the bended portions of the physical quantity detection device 200. Thus, the physical quantity detection device 210 can further reduce the stress produced on the fixing portions 84 and 94 by fixation of the fixing portions 84 and 94 to an external unit such as a package prior to transmission of the stress to the physical quantity detection element 40.

The numbers of the bended portions of the support members 80 and 90 are not specifically limited. For example, each of the support members 80 and 90 may have a reciprocating structure extended along the X axis while reciprocating along the Y axis.

2.2.2. Second Modified Example

Figure 13:
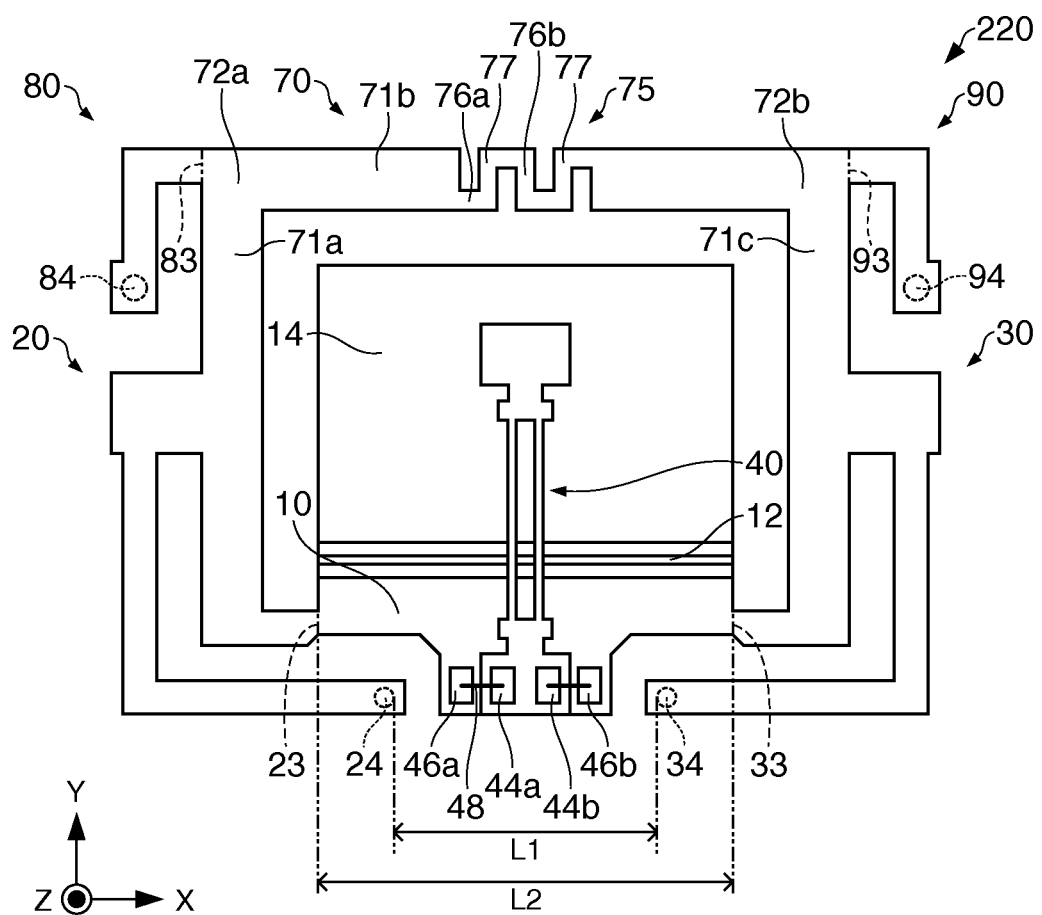
FIG. 13 is a plan view schematically illustrating a physical quantity detection device according to a second modified example of the second embodiment.

A physical quantity detection device according to a second modified example of the second embodiment is now explained with reference to the drawings. FIG. 13 is a plan view schematically illustrating a physical quantity detection device 220 according to the second modified example of the second embodiment.

The components and parts of the physical quantity detection device 220 having functions similar to those of the corresponding components and parts of the physical quantity detection device 200 have been given similar reference numbers, and the same detailed explanation is not repeated herein.

As illustrated in FIG. 13, the extended portion 71b of the frame 70 included in the physical quantity detection device 220 has a third reciprocating structure 75. The physical quantity detection device 220 is different from the physical quantity detection device 200 shown in FIG. 11 in this point. The third reciprocating structure 75 lies in the range of extension of the frame 70 from the third connecting portion 83 to the fourth connecting portion 93. For example, the third reciprocating structure 75 extends along the X axis while reciprocating along the Y axis. In other words, the frame 70 bends in the range of extension from the third support member 80 to the fourth support member 90.

According to the example shown in the figure, the third reciprocating structure 75 has extended portions 76a extended along the X axis, extended portions 76b extended along the Y axis, and bended portions 77 produced by connection between the extended portions 76a and the extended portions 76b. The plural extended portions 76a and the plural extended portions 76b are provided, wherefore the plural bended portions 77 are produced. According to the example shown in the figure, the four extended portions 76a, the three extended portions 76b, and the six bended portions 77 are equipped.

The physical quantity detection device 220 thus constructed can reduce the stress produced on the fixing portions 84 and 94 by fixation of the fixing portions 84 and 94 to an external unit such as a package by the function of the third reciprocating structure 75 prior to transmission of the stress to the physical quantity detection element 40. For example, the third reciprocating structure 75 may have elasticity. In this case, the stress produced on the fixing portions 84 and 94 can further decrease before reaching the physical quantity detection element 40.

2.2.3. Third Modified Example

Figure 14:
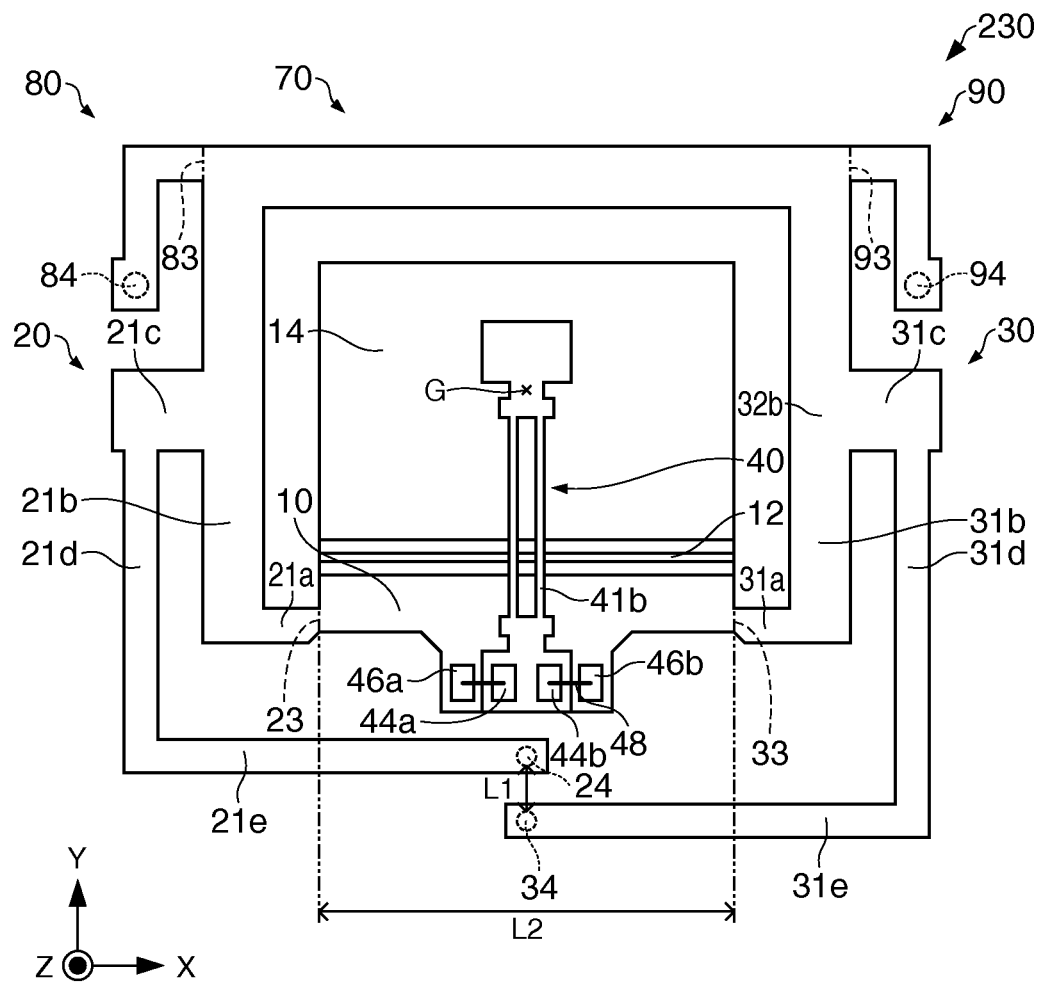
FIG. 14 is a plan view schematically illustrating a physical quantity detection device according to a third modified example of the second embodiment.

A physical quantity detection device according to a third modified example of the second embodiment is now explained with reference to the drawings. FIG. 14 is a plan view schematically illustrating a physical quantity detection device 230 according to the third modified example of the second embodiment.

The components and parts of the physical quantity detection device 230 having functions similar to those of the corresponding components and parts of the physical quantity detection device 200 have been given similar reference numbers, and the same detailed explanation is not repeated herein.

According to the physical quantity detection device 200 shown in FIG. 11, the fixing portions 24 and 34 are disposed in a line along the X axis. However, the fixing portions 24 and 34 of the physical quantity detection device 230 shown in FIG. 14 are disposed in a line along the Y axis. In other words, the fixing portions 24 and 34 in this modified example are positioned on a line extending along the Y axis.

According to the example shown in the figure, the fixing portions 24 and 34 are disposed on an axis (not shown) extending in parallel with the Y axis and passing through a center of gravity G of the physical quantity detection device 230. The length of the extended portion 31d of the second support member 30 (length in the Y axis) may be longer than the length of the extended portion 21d of the first support member 20 (length in the Y axis) as illustrated in FIG. 14.

The physical quantity detection device 230 thus constructed can further prevent a stress produced by thermal expansion of an external unit such as a package in the direction along the X axis from being transmitted to the physical quantity detection element 40 when compared with the physical quantity detection device 200.

2.2.4. Fourth Modified Example

Figure 15:
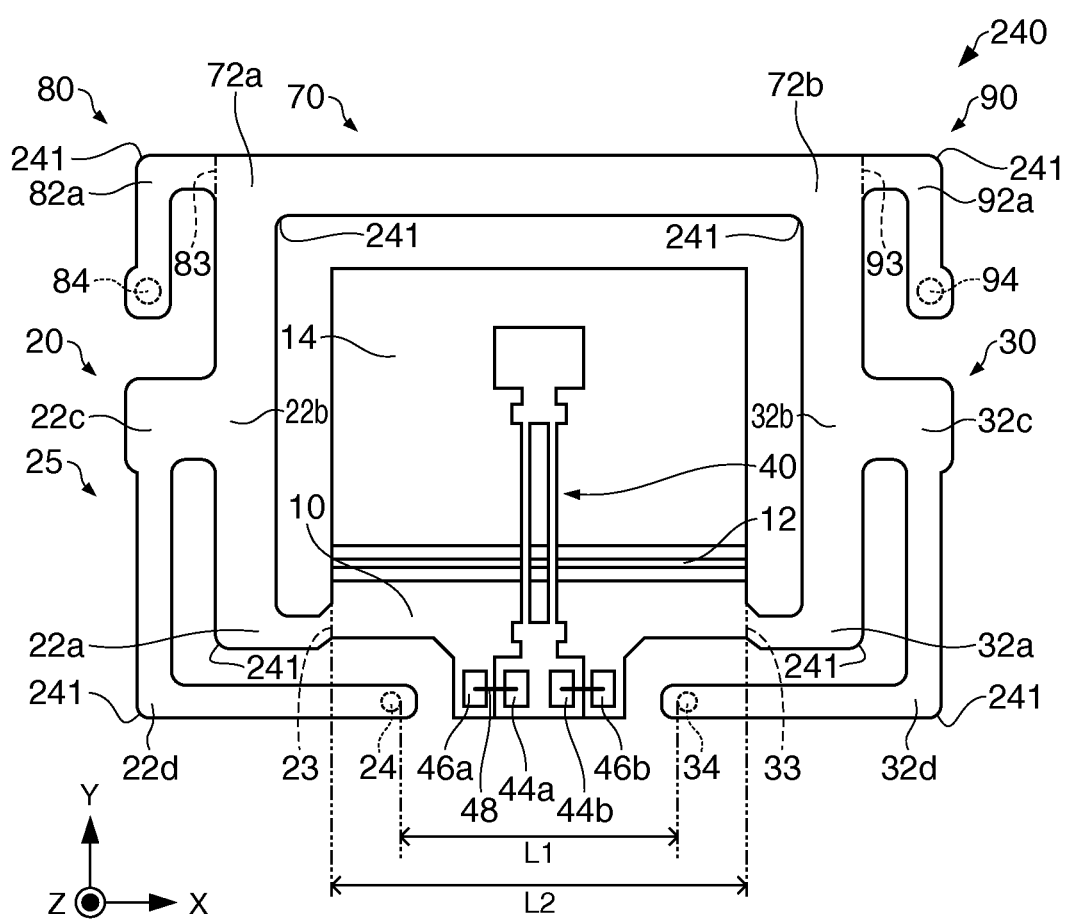
FIG. 15 is a plan view schematically illustrating a physical quantity detection device according to a fourth modified example of the second embodiment.

A physical quantity detection device according to a fourth modified example of the second embodiment is now explained with reference to the drawings. FIG. 15 is a plan view schematically illustrating a physical quantity detection device 240 according to the fourth modified example of the second embodiment.

The components and parts of the physical quantity detection device 240 having functions similar to those of the corresponding components and parts of the physical quantity detection device 200 have been given similar reference numbers, and the same detailed explanation is not repeated herein.

According to the physical quantity detection device 200 shown in FIG. 11, the bended portions 22a through 22d, 32a through 32d, 82a, and 92a of the support members 20, 30, 80, and 90 have right-angled corners. However, according to the physical quantity detection device 240 shown in FIG. 15, the bended portions 22a through 22d, 32a through 32d, 82a, and 92a of the support members 20, 30, 80, and 90 do not have right-angled corners but have curved surfaces 241. According to the example shown in the figure, the bended portions 72a and 72b of the frame 70 also have the curved surfaces 241.

In an alternative structure (not shown), the bended portions 22a through 22d, 32a through 32d, 72a, 72b, 82a, and 92a may have inclined surfaces inclined to the extension directions of the extended portions (X direction or Y direction) instead of right-angled corners.

According to the physical quantity detection device 240 thus constructed, the stress does not concentrate on particular points by the configurations of the curved surfaces 241 formed on the bended portions 22a through 22d, 32a through 32d, 72a, 72b, 82a, and 92a when compared with the physical quantity detection device 200.

3. Third Embodiment

Figure 16:
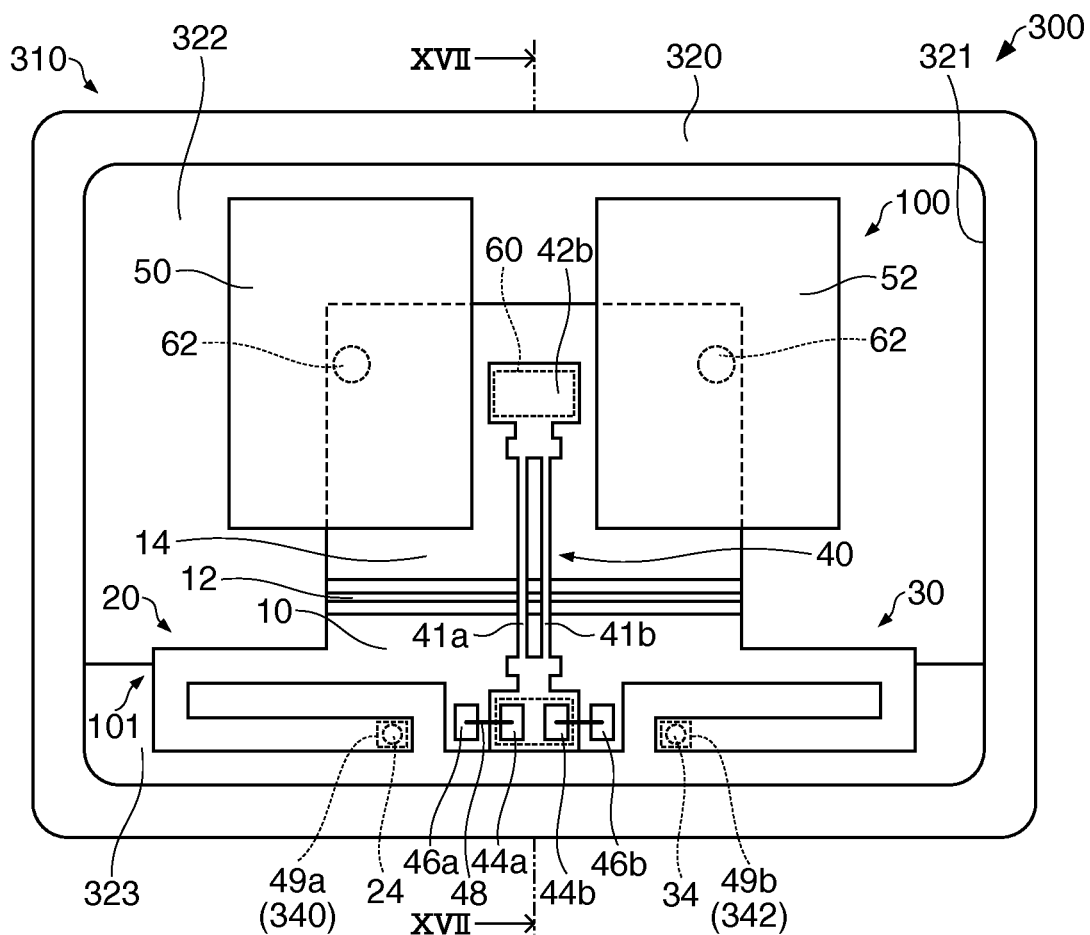
FIG. 16 is a plan view schematically illustrating a physical quantity detector according to a third embodiment.
Figure 17:
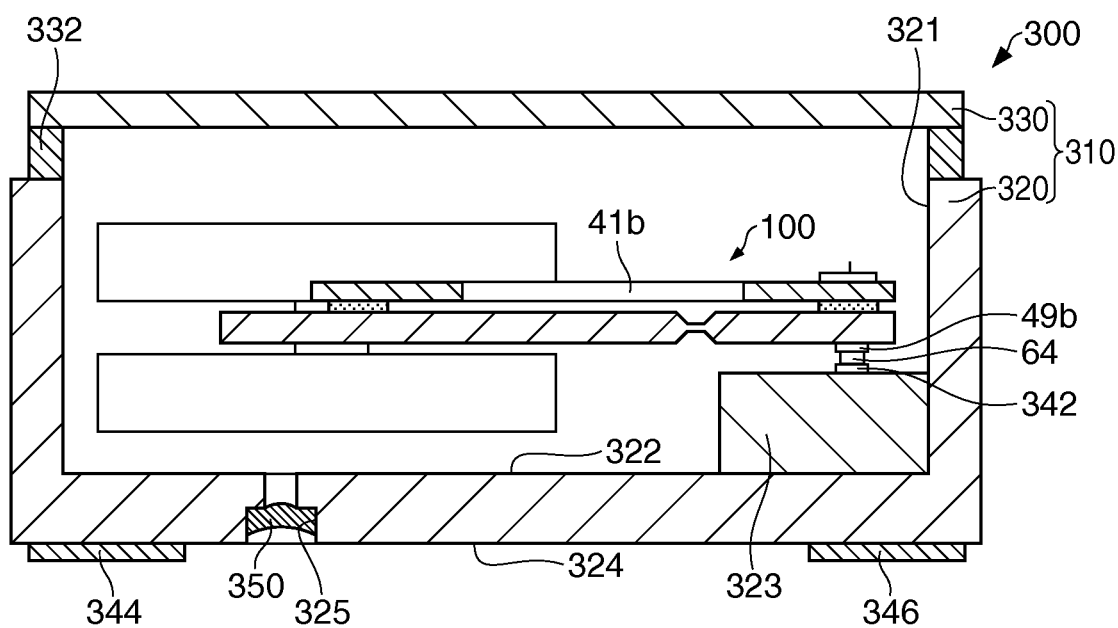
FIG. 17 is a cross-sectional view schematically illustrating the physical quantity detector according to the third embodiment.

A physical quantity detector according to a third embodiment is hereinafter described with reference to the drawings. FIG. 16 is a plan view schematically illustrating a physical quantity detector 300 according to the third embodiment. FIG. 17 is a cross-sectional view taken along a line XVII-XVII in FIG. 16, schematically illustrating the physical quantity detector 300 according to the third embodiment.

As illustrated in FIGS. 16 and 17, the physical quantity detector 300 includes the physical quantity detection device according to the embodiment of the invention, and a package 310. Discussed herein is an example of the physical quantity detector 300 containing the physical quantity detection device 100 as the physical quantity detection device according to the embodiment of the invention.

The package 310 houses the physical quantity detection device 100. The package 310 is allowed to have a package base 320 and a lid 330. FIG. 16 does not show the lid 330 for easy understanding of the figure.

A concave 321 is formed in the package base 320 to accommodate the physical quantity detection device 100. The planar shape of the package base 320 may be any shapes as long as the physical quantity detection device 100 can be housed within the concave 321. The package base 320 is made of sintered compact of aluminum oxide produced by forming ceramic green sheets, laminating formed green sheets and sintering the laminated sheets, or crystal, glass, silicon, or other materials, for example.

The material of the package base 320 may be the same as or different from the material of the structure 101 of the physical quantity detection device 100. It should be noted, however, that the technology of the invention is particularly advantageous when the coefficient of linear expansion of the package base 320 is different from the coefficient of linear expansion of the structure 101 due to the different materials of the package base 320 and the structure 101, and can prevent a stress produced on the structure 101 by the difference in the coefficient of linear expansion between the package base 320 and the structure 101 from being transmitted to the physical quantity detection element 40.

The package base 320 is allowed to have a step 323 projecting from an inside bottom 322 of the package base 320 (inside bottom of the concave) toward the lid 330. The step 323 is provided along the inner wall of the concave 321, for example. Internal terminals 340 and 342 are provided on the step 323.

The internal terminals 340 and 342 are disposed at positions opposed to the external connection terminals 49a and 49b provided on the fixing portions 24 and 34 of the physical quantity detection device 100 (positions overlapping with the external connection terminals 49a and 49b in the plan view). For example, the external connection terminal 49a is electrically connected with the internal terminal 340, while the external connection terminal 49b is electrically connected with the internal terminal 342.

External terminals 344 and 346 used when the physical quantity detector 300 is mounted on an external unit such as an electronic apparatus are provided on an outside bottom 324 (surface on the side opposite to the inside bottom 322) of the package base 320. The external terminals 344 and 346 are electrically connected with the internal terminals 340 and 342 via not-shown internal wirings. For example, the external terminal 344 is electrically connected with the internal terminal 340, while the external terminal 346 is electrically connected with the internal terminal 342.

Each of the internal terminals 340 and 342 and the external terminals 344 and 346 is constituted by a metal film which contains a metallized layer made of W or the like and a coating such as Ni and Au laminated on the metallized layer by plating or other methods.

A sealing portion 350 which seals the interior (cavity) of the package 310 is provided in the bottom of the concave 321 of the package base 320. The sealing portion 350 is disposed within a through hole 325 formed in the package base 320. The through hole 325 penetrates the package base 320 from the outside bottom 324 to the inside bottom 322. According to the example shown in the figures, the through hole 325 has a stepped shape whose hole diameter on the outside bottom 324 side is larger than the hole diameter on the inside bottom 322 side. For producing the sealing portion 350, a sealant constituted by Au/Ge alloy, solder or the like is placed within the through hole 325, fused by heating, and hardened, for example. The sealing portion 350 is designed to airtightly seal the interior of the package 310.

The fixing portions 24 and 34 of the support members 20 and 30 are fixed to the step 323 of the package base 320 via junction members 64. This structure allows the physical quantity detection device 100 to be mounted on the package base 320 and housed within the package 310.

By fixation of the fixing portions 24 and 34 to the step 323, the external connection terminals 49a and 49b provided on the fixing portions 24 and 34 and the internal terminals 340 and 342 provided on the step 323 are electrically connected with each other via the junction members 64. The junction members 64 are constituted by conductive adhesives of the silicon resin family mixed with a conductive material such as metal filler, for example.

The lid 330 is provided in such a manner as to cover the concave 321 of the package base 320. The lid 330 has a plate shape, for example. The lid 330 is made of the same material as that of the package base 320, or metal such as kovar, 42 alloy, and stainless steel. The lid 330 is joined to the package base 320 via a junction member 332 such as a seam ring, glass having a low melting point, and an adhesive.

For airtightly sealing the interior of the package 310, the sealant is placed within the through hole 325 under the depressurized condition of the interior of the package 310 (high-vacuum condition) after junction between the lid 330 and the package base 320, thereafter fused by heating, and hardened to produce the sealing portion 350. The interior of the package 310 may be filled with inert gas such as nitrogen, helium, and argon.

When a driving signal is transmitted to the oscillation electrodes of the physical quantity detection device 100 via the external terminals 344 and 346, the internal terminals 340 and 342, the external connection terminals 49a and 49b, the connection terminals 46a and 46b and others in the physical quantity detector 300, the oscillation beams 41a and 41b of the physical quantity detection element 40 oscillate (resonate) at a predetermined frequency. As a result, the physical quantity detector 300 is allowed to output an output signal corresponding to the resonance frequency of the physical quantity detection element 40 variable according to an applied acceleration.

The physical quantity detector 300 thus constructed includes the physical quantity detection device 100 capable of preventing transmission of the stress to the physical quantity detection element 40 in the manner explained above. Accordingly, the physical quantity detector 300 has high detection sensitivity.

In an alternative structure (not shown), the concave in which the physical quantity detection device 100 is disposed may be provided both in the package base 320 and in the lid 330, or provided only in the lid 330.

4. Fourth Embodiment

Figure 18:
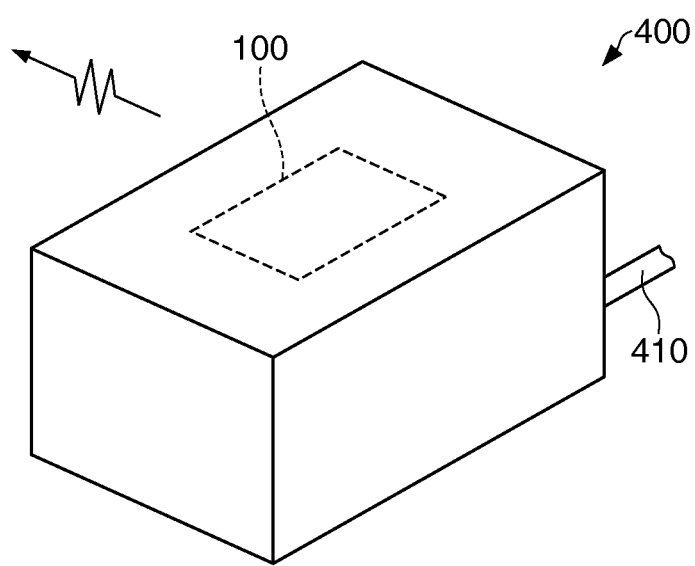
FIG. 18 is a perspective view schematically illustrating an electronic apparatus according to a fourth embodiment.

An electronic apparatus according to a fourth embodiment is hereinafter described. According to the fourth embodiment, an inclinometer including the physical quantity detection device of the embodiment of the invention (physical quantity detection device 100 in this example) will be discussed as an example of the electronic apparatus with reference to the drawings. FIG. 18 is a perspective view schematically illustrating an inclinometer 400 according to the fourth embodiment.

As illustrated in FIG. 18, the inclinometer 400 includes the physical quantity detection device 100 as an inclination sensor.

The inclinometer 400 is disposed at a measurement target point such as a slope of a mountain, a slope of a road, and a retaining wall of a fill-up ground. The inclinometer 400 receives power from the outside via a cable 410 or contains a power source, and transmits a driving signal to the physical quantity detection device 100 via a not-shown driving circuit.

The inclinometer 400 detects a change of the position of the inclinometer 400 by using a not-shown detection circuit based on a resonance frequency variable according to the gravitational acceleration applied to the physical quantity detection device 100 (i.e., a change of the direction in which the gravitational acceleration is applied to the inclinometer 400), converts the change into an angle, and transmits data on the angle to a base station by radio or other methods. This structure of the inclinometer 400 contributes to early discovery of abnormalities.

The inclinometer 400 includes the physical quantity detection device 100 capable of preventing transmission of the stress to the physical quantity detection element 40 in the manner explained above. Thus, the inclinometer 400 has high detection sensitivity.

The physical quantity detection device according to the embodiment of the invention is suited for applications such as acceleration sensors, inclination sensors and the like contained in seismographs, navigation systems, position control systems, game controllers, cellular phones and other devices, as well as the inclinometer discussed in this embodiment. The electronic apparatus provided as any of these applications can offer advantages similar to those discussed in the respective embodiments and modified examples.

Although various embodiments and modified examples have been described in the foregoing detailed description, the invention is not limited to the embodiments and modified examples disclosed only as examples but is susceptible to numerous modifications. For example, the technologies of the respective embodiments and modified examples may be combined when appropriate.

In the foregoing description, the connection body is constituted by a component extended from the first support member and the second support member to connect the first support member and the second support member. However, the connection body may have any structure as long as at least one end of the connection body extends directly from the base portion 10. However, in view of reduction of the transmission of the stress produced by fixation of the third fixing portion to the base portion 10 to the base portion 10, it is preferable that the connection body connects with the first support member and the second support member.

According to the examples of the invention, the frame 70 as the connection body connects the fourth fixing portion 84 and the fifth fixing portion 94. However, the fourth fixing portion 84 and the fifth fixing portion 94 are not required to be connected via the connection body in the examples other than the embodiment shown in FIG. 13. That is, the connecting portion connecting with the third support member and the connecting portion connecting with the fourth support member may be separated from each other.

However, in the case of the structure which connects the third support member 80 and the fourth support member 90 via the connection body of the frame 70, for example, the positional relationship between the fourth fixing portion 84 and the fifth fixing portion 94 does not easily change at the time of fixation between an external unit and the fourth fixing portion 84 and the fifth fixing portion 94. Thus, a stress which may be produced depending on the assembly accuracy of the physical quantity detection device 100 is difficult to be produced.

The number of each of the third fixing portion 74, the fourth fixing portion 84, and the fifth fixing portion 94 provided on the device may be plural.

The invention includes structures substantially similar to the structures disclosed in the respective embodiments (such as similar structures in view of functions, methods, and results, or similar structures in view of purposes and advantages). The invention also includes structures which are similar to the structures disclosed in the respective embodiments except for an unessential part thereof and contain replacements for the unessential part. The invention further includes structures offering advantages or achieving purposes similar to those of the structures disclosed in the respective embodiments. The invention still further includes structures which add known technologies to the structures disclosed in the respective embodiments.

The entire disclosure of Japanese Patent Application No. 2011-239119, filed Oct. 31, 2011 is expressly incorporated by reference herein.

What is claimed is:

1. A physical quantity detection device, comprising:
   a base portion;
   a movable portion supported by the base portion via a joint and shifting in accordance with a change of a physical quantity;
   a physical quantity detection element extending over the base portion and the movable portion;
   a first support member extending from the base portion and having a first fixing portion; and
   a second support member extending from the base portion and having a second fixing portion,
   wherein the distance between the first fixing portion and the second fixing portion is shorter than the distance between a root of the first support member at the junction with the base portion and a root of the second support member at the junction with the base portion,
   the first support member includes a first extended portion, a second extended portion, a third extended portion, a first bended portion between the first extended portion and the second extended portion, and a second bended portion between the second extended portion and the third extended portion located between the base portion and the first fixing portion, and
   the second support member includes a fourth extended portion, a fifth extended portion, a sixth extended portion, a third bended portion between the fourth extended portion and the fifth extended portion, and a fourth bended portion between the fifth extended portion and the sixth extended portion located between the base portion and the second fixing portion.

2. The physical quantity detection device according to claim 1, further comprising:
   a connection body disposed with a clearance left between the connection body and the movable portion and extending from at least either the first support member or the second support member, or from the base portion,
   wherein
   the connection body has a third fixing portion at which the connection body is fixed, and
   the center of gravity of the physical quantity detection device lies in a range surrounded by the first fixing portion, the second fixing portion, and the third fixing portion in the plan view.

3. The physical quantity detection device according to claim 1, further comprising:
   a connection body disposed with a clearance left between the connection body and the movable portion and extending from at least either the first support member or the second support member, or from the base portion; and
   a third support member extending from the connection body and having a third fixing portion,
   wherein the center of gravity of the physical quantity detection device lies in a range surrounded by the first fixing portion, the second fixing portion, and the third fixing portion in the plan view.

4. The physical quantity detection device according to claim 1, further comprising:
   a connection body disposed with a clearance left between the connection body and the movable portion and extending from at least either the first support member or the second support member, or from the base portion;
   a third support member extending from the connection body and having a third fixing portion; and
   a fourth support member extending from the connection body and having a fourth fixing portion,
   wherein the center of gravity of the physical quantity detection device lies in a range surrounded by the first fixing portion, the second fixing portion, the third fixing portion, and the fourth fixing portion in the plan view.

5. The physical quantity detection device according to claim 4, wherein the connection body is bended in the range of extension from the third support member to the fourth support member.

6. The physical quantity detection device according to claim 1, wherein the base portion, the first fixing portion, and the second fixing portion are arranged on a line in the plan view.

7. A physical quantity detector, comprising:
   the physical quantity detection device according to claim 1; and
   a package which houses the physical quantity detection device.

8. An electronic apparatus, comprising the physical quantity detection device according to claim 1.

9. The physical quantity detection device according to claim 1, wherein
   the first extended portion and the third extended portion are parallel,
   the second extended portion is orthogonal to the first extended portion and the third extended portion,
   the fourth extended portion and the sixth extended portion are parallel, and
   the fifth extended portion is orthogonal to the fourth extended portion and the sixth extended portion.

10. The physical quantity detection device according to claim 9, wherein the first extended portion and the fourth extended portion are extended in an extension direction of the movable portion.

11. The physical quantity detection device according to claim 10, wherein the width of the first extended portion is larger than the width of the second extended portion; and the width of the fourth extended portion is larger than the width of the fifth extended portion.

12. A physical quantity detector, comprising:

the physical quantity detection device according to claim 11; and a package which houses the physical quantity detection device.

13. An electronic apparatus, comprising the physical quantity detection device according to claim 11.

14. The physical quantity detection device according to claim 1, wherein the base portion, the first support member and the second support member are formed of a same material.

* * * * *